United States Patent
Kimura et al.

(10) Patent No.: US 7,889,926 B2
(45) Date of Patent: Feb. 15, 2011

(54) IMAGE DICTIONARY CREATING APPARATUS, CODING APPARATUS, IMAGE DICTIONARY CREATING METHOD

(75) Inventors: Shunichi Kimura, Kanagawa (JP); Yutaka Koshi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1121 days.

(21) Appl. No.: 11/067,904

(22) Filed: Mar. 1, 2005

(65) Prior Publication Data
US 2005/0226517 A1 Oct. 13, 2005

(30) Foreign Application Priority Data
Apr. 12, 2004 (JP) ............... 2004-116647

(51) Int. Cl.
G06K 9/18 (2006.01)
G06K 9/46 (2006.01)
G06K 9/62 (2006.01)

(52) U.S. Cl. .................. 382/182; 382/204; 382/209
(58) Field of Classification Search ........ 382/181, 382/182, 204, 209
See application file for complete search history.

(56) References Cited

U.S. PATENT DOCUMENTS

| | | | | |
|---|---|---|---|---|
| 5,729,637 | A * | 3/1998 | Nicholson et al. | 382/282 |
| 5,889,897 | A * | 3/1999 | Medina | 382/310 |
| 6,289,124 | B1 * | 9/2001 | Okamoto | 382/187 |
| 6,741,745 | B2 * | 5/2004 | Dance et al. | 382/229 |
| 2002/0076111 | A1 | 6/2002 | Dance et al. | |
| 2007/0113245 | A1 * | 5/2007 | Tan et al. | 725/38 |

FOREIGN PATENT DOCUMENTS

| | | |
|---|---|---|
| CN | 1234565 A | 11/1999 |
| JP | A 62-229489 | 10/1987 |
| JP | A 63-082061 | 4/1988 |
| JP | 06-231310 | 8/1994 |
| JP | 08-255223 | 10/1996 |
| JP | A 10-178638 | 6/1998 |
| JP | B2 2895834 | 3/1999 |
| JP | A 2003-050971 | 3/2003 |

OTHER PUBLICATIONS

Nov. 6, 2009 Office Action issued in Chinese patent application No. CN 200510053871.0 (with English translation).
Mar. 30, 2010 Office Action issued in Japanese patent application No. 2004-116647 (with translation).
Office Action issued in JP Application No. 2004-116647 on Nov. 9, 2010 (with English translation).

* cited by examiner

Primary Examiner—Kathleen S Yuan
(74) Attorney, Agent, or Firm—Oliff & Berridge, PLC

(57) ABSTRACT

An image processor obtains character images included in input image and the character codes for identifying the characters represented by the character images, classifies the character images included in the input image into a plurality of character image groups based on the obtained character codes, determines typical image patterns constituting the input image based on the character images classified in the character image groups, assigns indices for identifying the image patterns to the determined image patterns, and codes the occurrence position information of the character images included in the input image and the indices of the image patterns corresponding to the character images so as to be associated with each other.

6 Claims, 22 Drawing Sheets

CODING SIDE — CHARACTER CODES, FONT TYPES, POSITIONS OF OCCURRENCE, ETC. → DECODING SIDE

DIFFERENT CODING METHODS FOR CHARACTERS AND IMAGES

FONT DB ←---- ASSOCIATION IS REQUIRED ----→ FONT DB

| INDEX | IMAGE PATTERN (BINARY IMAGE) |
|---|---|
| #001 | FILE 001 |
| #002 | FILE 002 |
| ⋮ | ⋮ |

S40 IMAGE PATTERN DETERMINATION PROCESSING

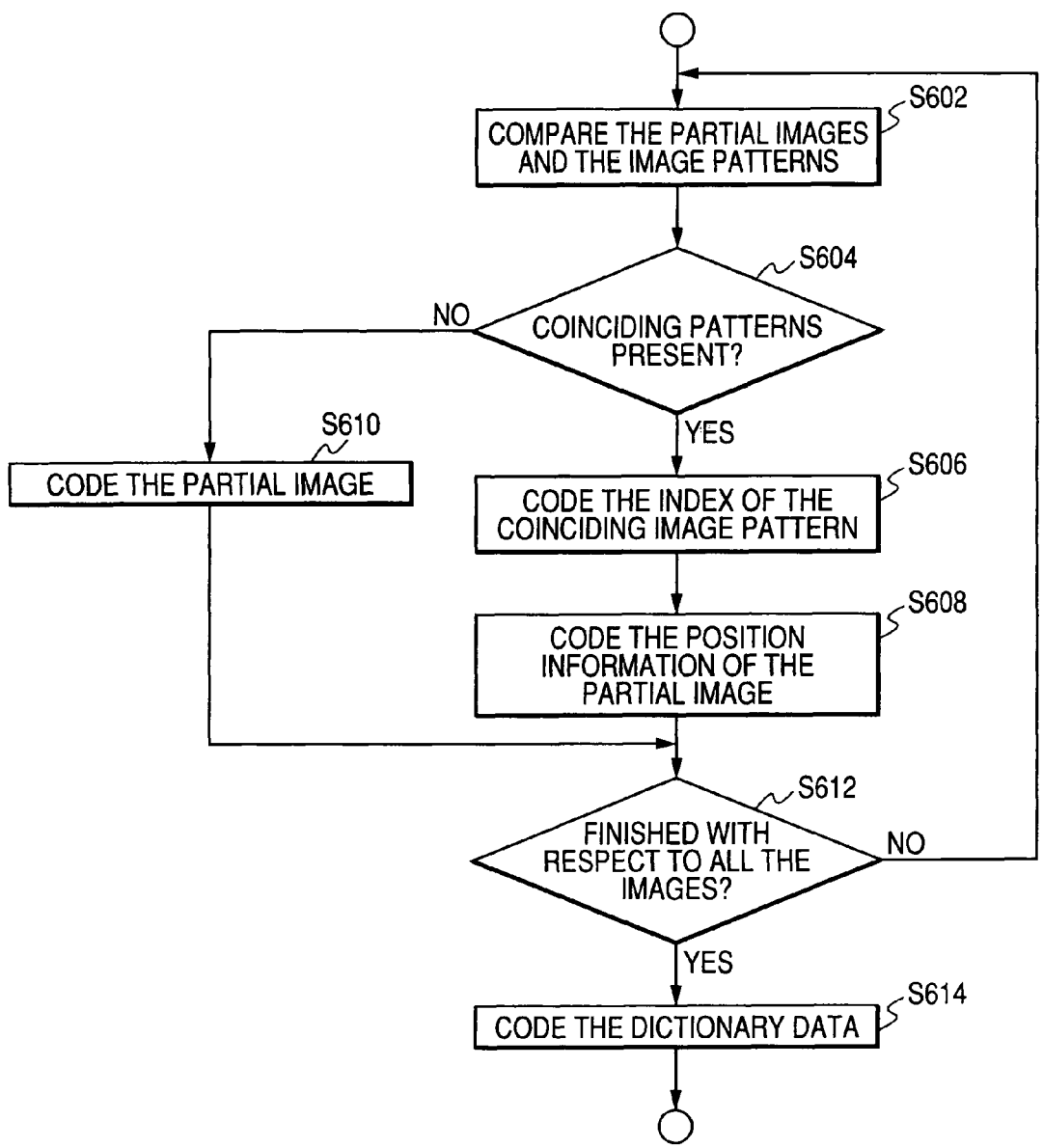

THE SAME CHARACTER CODE

CHARACTER RECOGNITION ERROR

THE SAME CHARACTER CODE ("1" OR "I")

S42 MAGE PATTERN DETERMINATION PROCESSING

THE SAME CHARACTER CODE

FIRST LEVEL PATTERN     SECOND LEVEL PATTERN b

SECOND LEVEL PATTERN a

S44 IMAGE PATTERN DETERMINATION PROCESSING

FIG. 17

| ACCURACY | CHARACTER CODE | CHARACTER IMAGE |
|---|---|---|
| NOT LESS THAN 90% | 0x23 | #001, #003, ... |
| | 0x51 | #002, ... |
| | ⋮ | ⋮ |
| NOT LESS THAN 70% AND LESS THAN 90% | 0x21 | #010, #0014, ... |
| | 0x51 | #005, ... |
| | ⋮ | ⋮ |
| LESS THAN 70% | 0x32 | #009, #0012, ... |
| | 0x51 | #0011, ... |
| | ⋮ | ⋮ |

THE SAME CHARACTER CODE

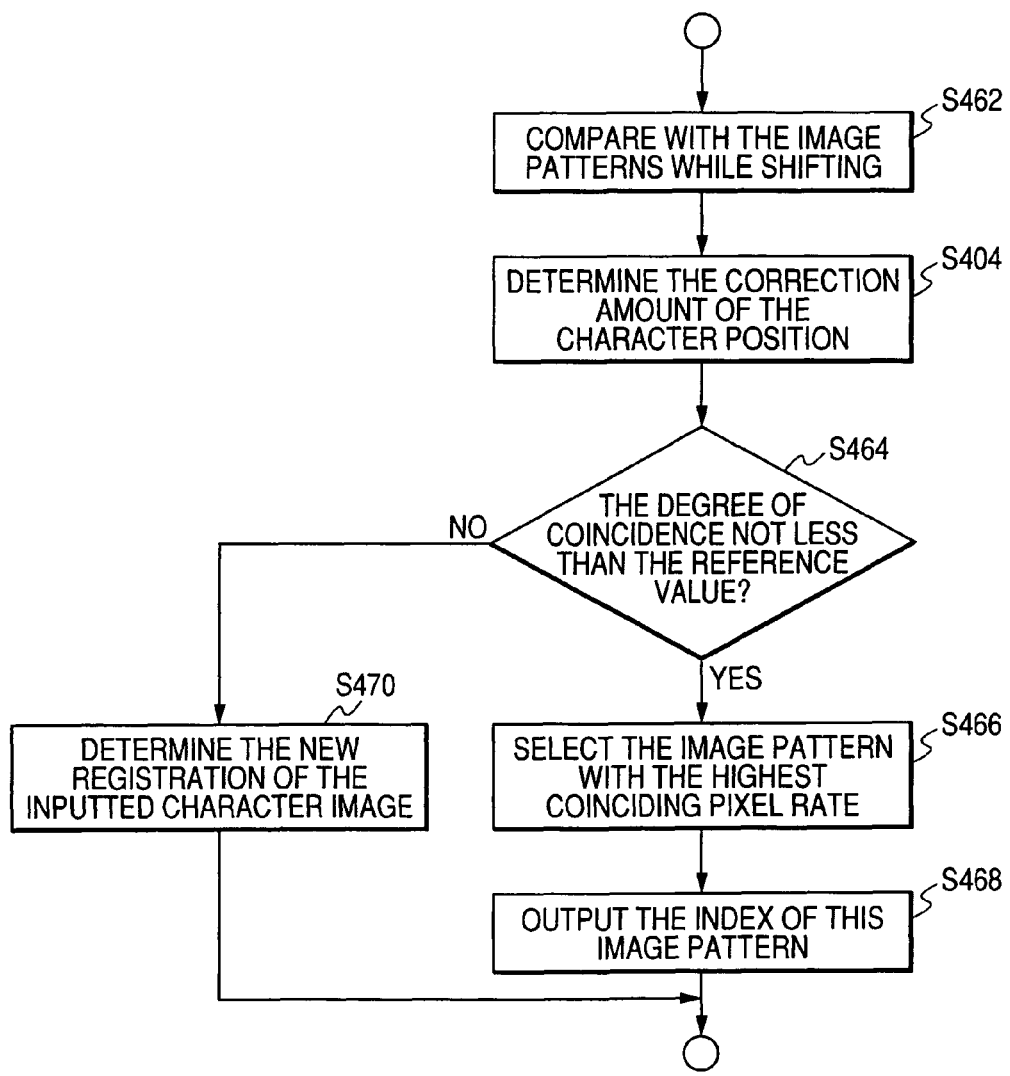

FIG. 21A

| CHARACTER CODE | WEIGHT ASSIGNMENT |
|---|---|
| COINCIDENCE | 1.2 TIMES |
| NONCOINCIDENCE | 1 TIME |

FIG. 21B

| RECOGNITION ACCURACY | WEIGHT ASSIGNMENT |
|---|---|
| NOT LESS THAN 90% | 1.2 TIMES |
| NOT LESS THAN 70% AND LESS THAN 90% | 1 TIME |
| LESS THAN 70% | 0.8 TIMES |

S48 IMAGE PATTERN REGISTRATION DETERMINATION PROCESSING

IMAGE DICTIONARY CREATING APPARATUS, CODING APPARATUS, IMAGE DICTIONARY CREATING METHOD

BACKGROUND OF THE INVENTION

1. Field of the Invention

The present invention relates to a coding apparatus that creates an image dictionary in which the image patterns constituting the input image and the identification information of the image patterns are associated with each other, and applies the created image dictionary to the coding processing.

2. Description of the Related Art

For example, it is known to provide an image recording apparatus in which image information having a first image comprising a photographic image or graphics and a second image comprising characters is inputted, the area of the second image in the image information is detected, and the area of the second image is extracted from the image information and recorded. This enables the characters within the area of the second image to be converted into character codes and recorded for use as a keyword for retrieval. It is also known to provide a character area coding method in which a font database common to the coding and decoding sides is provided and the character codes, the font type and the like are coded.

SUMMARY OF THE INVENTION

The present invention has been made in view of the above circumstances and provides a coding apparatus that creates an image dictionary realizing high coding efficiency and applies this image dictionary for coding.

According to one aspect of the invention, there is provided with an image dictionary creating apparatus including: an information obtaining section for obtaining a result of a character recognition processing on an input image; a character classifying section for classifying character images included in the input image into a plurality of character image groups based on the result of the character recognition processing obtained by the information obtaining section; typical pattern determining section for determining typical image patterns constituting the input image based on the character images classified into the character image groups by the character classifying section; and an identification information assigning section for assigning identification information for identifying the image patterns, to the image patterns determined by the typical pattern determining section.

According to another aspect of the invention, the information obtaining section obtains character identification information for identifying a character represented by each character image as the result of the character recognition processing, and the character classifying section classifies the character images included in the input image into the plurality of character image groups based on the character identification information obtained by the information obtaining section.

According to another aspect of the invention, the character identification information includes character codes, the character classifying section classifies the character images included in the input image based on the character codes, and based on the character images classified as having the same character code, the typical pattern determining section determines image patterns corresponding to the character images.

According to another aspect of the invention, the information obtaining section obtains character area information representative of an area of each character image in the input image, character image extracting section is further provided for extracting the character images from the input image based on the character area information obtained by the information obtaining section, the character classifying section classifies the character images extracted by the character image extracting section into a plurality of character image groups, and the typical pattern determining section determines the image patterns by comparing the character images extracted by the character image extracting section with each other.

According to another aspect of the invention, the following are further provided: coincidence determining section for determining a degree of coincidence of a plurality of character images extracted by the character image extracting section by comparing the character images with each other at a plurality of relative positions; area correcting section for correcting character area information of each character image based on the degree of coincidence determined at each relative position by the coincidence determining section; and outputting section for outputting the character area information of each of the character images corresponding to the image patterns so as to be associated with the identification information of the image patterns.

According to another aspect of the invention, coincidence determining section is further provided for determining a degree of coincidence of a plurality of character images classified into the character image groups by the character classifying section by comparing the character images with each other, the typical pattern determining section determines at least one image pattern with respect to the plurality of character images classified into the same character image group based on the degree of coincidence determined by the coincidence determining section, and the identification information assigning section assigns the identification information for identifying the image pattern to at least one image pattern determined with respect to the same character image group by the typical pattern determining section.

According to another aspect of the invention, coincidence determining section is provided for determining the degree of coincidence of each area included in a plurality of character images classified into the character image groups by the character classifying section by comparing the character images with each other, and the typical pattern determining section determines a plurality of image patterns constituting the character images based on the degree of coincidence determined with respect to each area by the coincidence determining section.

According to another aspect of the invention, the information obtaining section further obtains recognition accuracy information of the character recognition processing so as to be associated with the character identification information or the character area information thereof, and the character classifying section classifies the character images included in the input image into a plurality of character image groups based on the recognition accuracy information and the corresponding character identification information or character area information.

According to another aspect of the invention, there is provided with an image dictionary creating apparatus including: a pattern storing section for storing typical image patterns constituting an input image; coincidence determining section for determining a degree of coincidence by comparing a newly inputted character image and the image patterns stored by the pattern storing section; and typical pattern determining section for storing the newly inputted character image into the pattern storing section as the image pattern according to the degree of coincidence determined by the coincidence degree determining section.

According to another aspect of the invention, the pattern storing section stores identification information of characters represented by the image patterns so as to be associated with the image patterns, weight assigning section is further provided for performing weight assignment on the degree of coincidence determined with respect to the image patterns by the coincidence degree determining section based on the identification information of a character represented by the inputted character image and the identification information of the image patterns stored in the pattern storing section, and the typical pattern determining section determines whether to permit registration of the image pattern based on the inputted character image or not based on the degree of coincidence on which weight assignment has been performed by the weight assigning section.

According to another aspect of the invention, the identification information of the characters are character codes, the weight assigning section performs weight assignment so that the degree of coincidence is higher when a character code of the inputted character image coincides with a character code of any of the image patterns than when the character codes are different from each other, and the typical pattern determining section prohibits the registration of the image pattern based on the character image when the degree of coincidence is higher than a reference, and permits the registration of the image pattern based on the character image when the degree of coincidence is equal to or less than the reference.

According to another aspect of the invention, character codes are ones determined by the character recognition processing on the input image, and based on a recognition accuracy of the character recognition processing on the inputted character image, the weight assigning section performs weight assignment such that the higher the recognition accuracy is, the higher the degree of coincidence is.

According to another aspect of the invention, there is provided with an image dictionary creating apparatus including: an information obtaining section for obtaining character images included in an input image and character identification information for identifying characters represented by the character images; character classifying section for classifying the character images included in the input image into a plurality of character image groups based on the character identification information obtained by the information obtaining section; typical pattern determining section for determining typical image patterns constituting the input image based on the character images classified into the character image groups by the character classifying section; and identification information assigning section for assigning identification information for identifying the image patterns, to the image patterns determined by the typical pattern determining section.

According to another aspect of the invention, there is provided with an image dictionary creating apparatus including: an information obtaining section for obtaining character area information representative of an area of each character image in the input image; character image extracting section for extracting the character images from the input image based on the character area information obtained by the information obtaining section; typical pattern determining section for determining typical image patterns constituting the input image based on the character images extracted by the character image extracting section; and identification information assigning section for assigning identification information for identifying the image patterns, to the image patterns determined by the typical pattern determining section.

According to another aspect of the invention, there is provided with a coding apparatus including: an information obtaining section for obtaining character images included in an input image and character identification information for identifying characters represented by the character images; character classifying section for classifying the character images included in the input image into a plurality of character image groups based on the character identification information obtained by the obtaining section; typical pattern determining section for determining typical image patterns constituting the input image based on the character images classified into the character image groups by the character classifying section; identification information assigning section for assigning identification information for identifying the image patterns, to the image patterns determined by the typical pattern determining section; and coding section for coding character area information representative of areas of the character images included in the input image and identification information of image patterns corresponding to the character images so as to be associated with each other.

According to another aspect of the invention, there is provided with a coding apparatus including: an information obtaining section for obtaining character area information representative of an area of each character image in the input image; character image extracting section for extracting the character images from the input image based on the character area information obtained by the information obtaining section; character classifying section for classifying the character images extracted by the character image extracting section into a plurality of character image groups; typical pattern determining section for determining typical image patterns constituting the input image based on the character images classified into the character image groups by the character classifying section; identification information assigning section for assigning identification information for identifying the image patterns, to the image patterns determined by the typical pattern determining section; coincidence determining section for determining a degree of coincidence of the character images by comparing the plurality of character images classified into the character image groups by the character classifying section with each other at a plurality of relative positions; area correcting section for correcting the character area information of the character images based on the degree of coincidence determined at the relative positions by the coincidence determining section; and coding section for coding at least the character area information of the character images corrected by the area correcting section and the identification information of the image patterns determined based on the character image groups into which the character images are classified.

By thus configuration, a high compression rate can be realized while character readability is maintained.

According to another aspect of the invention, there is provided with an image dictionary creating method including: character images included in an input image and character identification information for identifying characters represented by the character images are obtained, the character images included in the input image are classified into a plurality of character image groups based on the obtained character identification information, typical image patterns constituting the input image are determined based on the character images classified into the character image groups, and identification information for identifying the image patterns is assigned to the determined image patterns.

BRIEF DESCRIPTION OF THE DRAWINGS

Embodiments of the present invention will be described in detail based on the following figures, wherein:

FIG. 9 is a flowchart explaining a coding processing (S60) in more detail;

FIG. 17 is a view illustrating the image dictionary created for each accuracy of the character recognition processing;

FIG. 20 is a flowchart explaining an image pattern registration determination processing (S46) according to the second embodiment in more detail;

FIG. 21A is a view illustrating the weight assignment coefficients of the weight assignment processing based on the character codes, and FIG. 21B is a view illustrating the weight assignment coefficient of the weight assignment processing based on the accuracy of the character recognition processing.

DESCRIPTION OF THE PREFERRED EMBODIMENTS

First, to aid the understanding of the present invention, the background and outline thereof will be described.

An image processor 2 is capable of realizing a high compression rate, for example, by coding the identification information, the positions of occurrence and the like of the character images included in the input image instead of coding the respective character images.

Figure 1A:
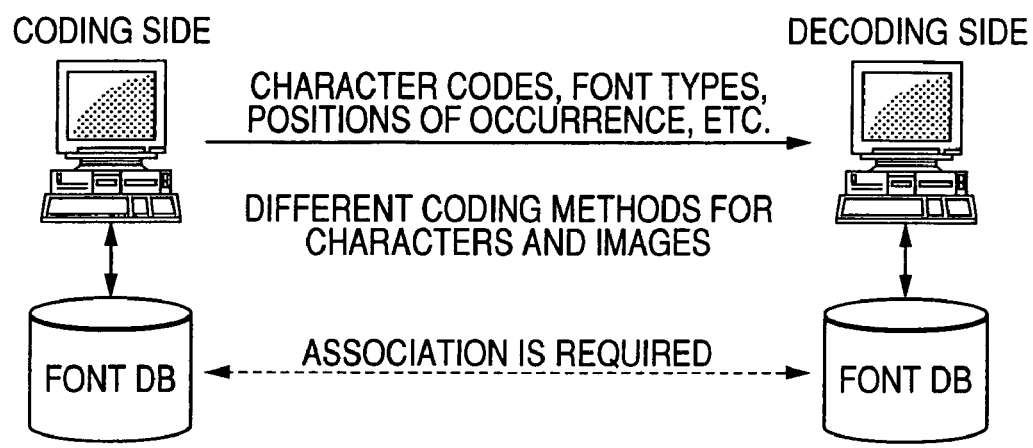
FIG. 1A is a view explaining a coding method premised on the presence of a common font database.
Figure 1B:
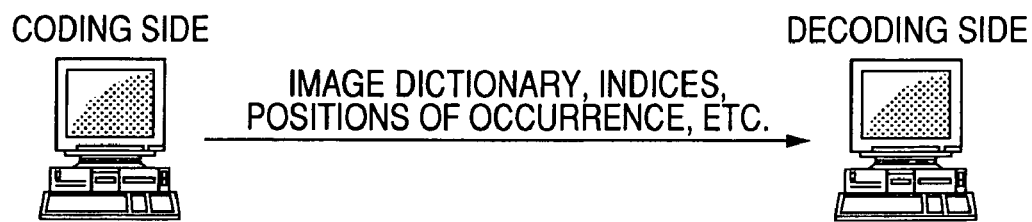
FIG. 1B is a view explaining a coding method premised on the attachment of an image dictionary.

FIG. 1A is a view explaining a coding method premised on the presence of a common font database, and FIG. 1(B) is a view explaining a coding method premised on the attachment of an image dictionary.

As shown in FIG. 1A, when a common font database storing character images so as to be associated with the identification information (the character codes and the font types) is present on both the coding and decoding sides, the image processor on the coding side is capable of transmitting image data to the image processor on the decoding side at a high compression rate by coding the identification information (the character codes and the font types) of the character images and the positions of occurrence of the character images. In this case, the image processor on the decoding side decodes the received coded data (the character codes and the font types), and generates character images based on the decoded character codes and font types and the font image registered in the font database.

However, according to the coding method premised on the presence of the font database, it is necessary to provide the font database on each of the coding and decoding sides, so that a large part of the storage area compressed by the font database. Moreover, when the font database on the coding side is updated, it is necessary to update the font database on the decoding side accordingly. Moreover, support for handwritten characters and the like is insufficient such that reproducibility is reduced because handwritten characters and the like are replaced with font images and that the code amount cannot be reduced because handwritten characters are treated as non-character images.

Accordingly, in the image processor 2 of the present embodiment, as shown in FIG. 1B, on the decoding side, image patterns that are typically present in the input image are registered (formed into an image dictionary) so as to be associated with indices, and the image patterns included in the input image are coded after being replaced with the associated indices and the positions of occurrence thereof. The coding side transmits, to the decoding side, the image dictionary in which the image patterns and the indices are associated with each other and the coded indices and positions of occurrence. The decoding side decodes the indices and the positions of occurrence, selects the image patterns corresponding to the decoded indices from the image dictionary, and disposes them in the decoded positions of occurrence.

As described above, the image processor 2 is capable of realizing a high compression rate without being premised on the presence of the common database by creating an image dictionary according to the input image and transmitting and receiving it. Moreover, it is unnecessary to synchronize the font databases on the coding and decoding sides. Further, also for handwritten characters and the like, the code amount can be reduced while sufficient reproducibility is maintained. To reduce the code amount, it is desirable that the image dictionary be also coded.

Figures 2A, 2B:
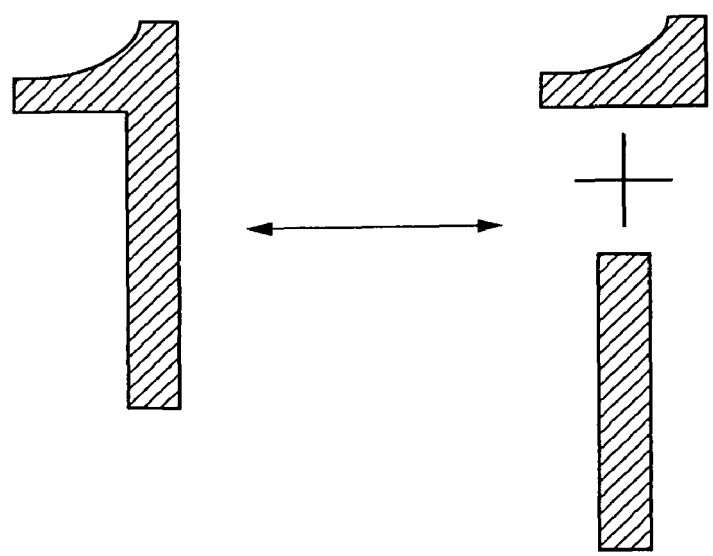
FIG. 2A is a view illustrating an image dictionary.
FIG. 2B is a view illustrating image patterns.

FIG. 2A is a view illustrating the image dictionary, and FIG. 2B is a view illustrating the image patterns.

As illustrated in FIG. 2A, the image dictionary includes a plurality of image patterns included in the input image and indices assigned to identify the image patterns. The image patterns are partial image data included in the input image, and in this example, are typical patterns (binary data) that occur not less than a specified number of times (a plurality of number of times) in the input image (binary). Moreover, the indices are, for example, identification information individually generated for each input image, and may be serial numbers or the like assigned to the image patterns in the order in which the image patterns are extracted from the input image.

The next problem is the reference based on which the image patterns are extracted from the input image and registered as the image dictionary. This is a problem because the code amount of the input image differs according to the sizes and the frequencies of occurrence of the extracted image patterns. For example, as illustrated in FIG. 2B, the following cases are considered: a case where the image patterns are extracted in units of character images; and a case where the image patterns are extracted in units smaller than character images.

In the case where the image patterns are extracted in units smaller than character images, although the frequencies of occurrence of the image patterns are frequently high (for example, the vertical bar part of "1" occurs as parts of "L" and "J"), the number of image patterns to be registered in the image dictionary is large, so that the data amount of the image dictionary is large.

On the other hand, when the image patterns are extracted in units of character images, since many characters of the same language, the same font type and the same font size appear in the same document, a high frequency of occurrence can be expected although the image pattern size is large.

Moreover, when a certain degree of irreversibility is allowed with the aim of achieving a high compression rate, in the image processor on the coding side, not only the partial images the same as the image patterns but also the partial images similar to the image patterns are replaced with indices and coded. In this case, if each part of a character image is replaced with a similar image pattern, there is a possibility that readability is lost by the character image being decoded into a completely different character as a whole. However, when the image patterns are extracted in units of character images, since the overall shape of the character image is replaced with a similar image pattern (for example, a numeric character "1" and a letter "I" of the alphabet), a certain degree of readability is maintained.

Thus, in the image processor 2 of the present embodiment, the image patterns are extracted from the input image in units of character images and registered in the image dictionary.

Next, the hardware configuration of the image processor 2 will be described.

Figure 3:
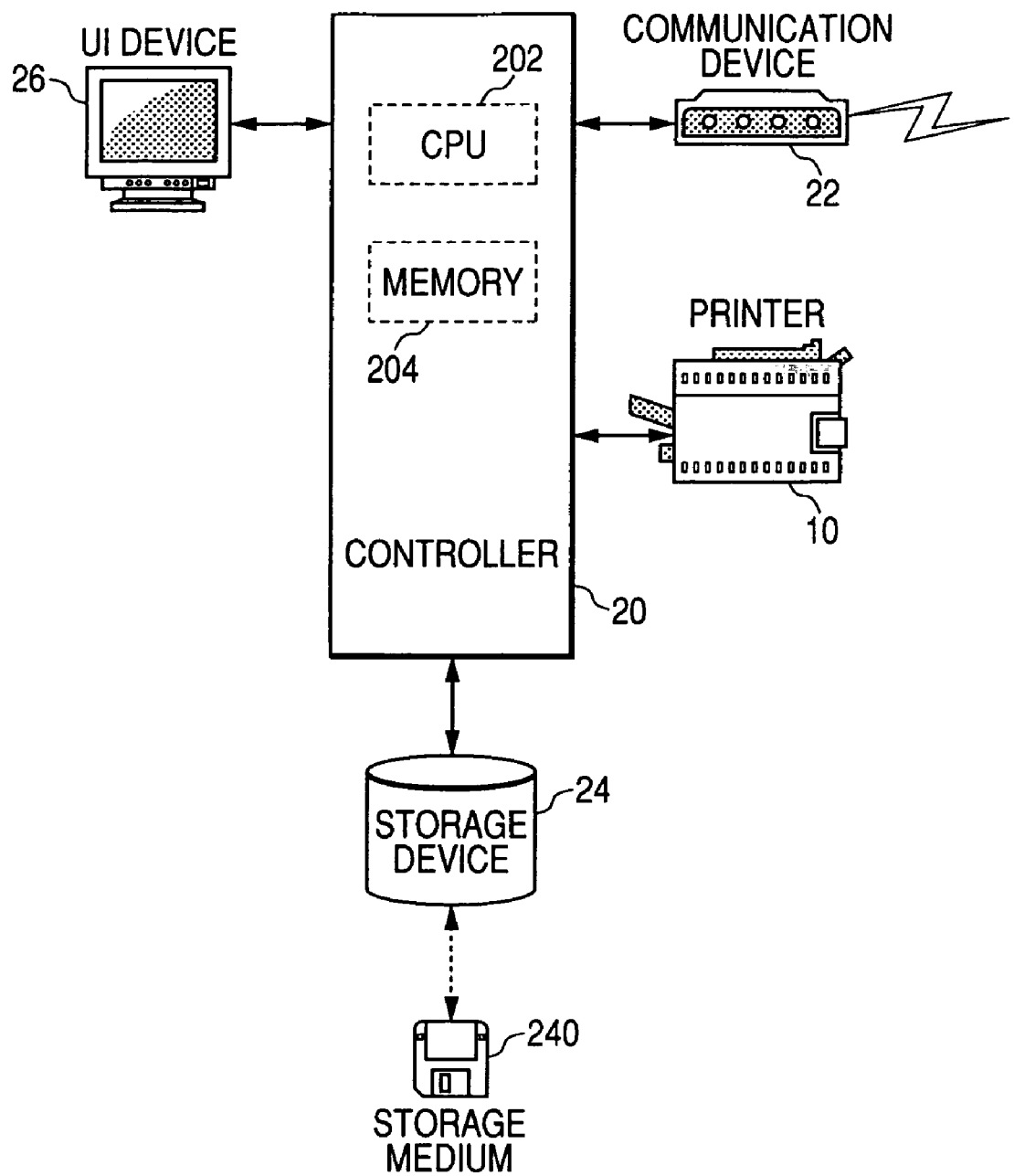
FIG. 3 is a view illustrating, with a controller 20 in the center, the hardware configuration of an image processor 2 to which an image dictionary creating method according to one embodiment of the present invention is applied.

FIG. 3 is a view illustrating, with a controller 20 in the center, the hardware configuration of the image processor 2 to which the image dictionary creating method according to the present invention is applied.

As illustrated in FIG. 3, the image processor 2 comprises: the controller 20 including a CPU 202 and a memory 204; a communication device 22; a storage device 24 such as an HDD or a CD device; and a user interface device (UI device) 26 including an LCD or a CRT display and a keyboard/touch panel.

The image processor 2 is, for example, a general-purpose computer in which a coding computer-readable record medium 5 (herein after referred to as a coding program 5) is installed as part of the printer driver, and obtains image data through the communication device 22 or the storage device 24, codes the obtained image data and transmits the coded image data to a printer 10. Moreover, the image processor 2 obtains the image data optically read by the scanner function of the printer 10, and codes the obtained image data.

Figure 4:
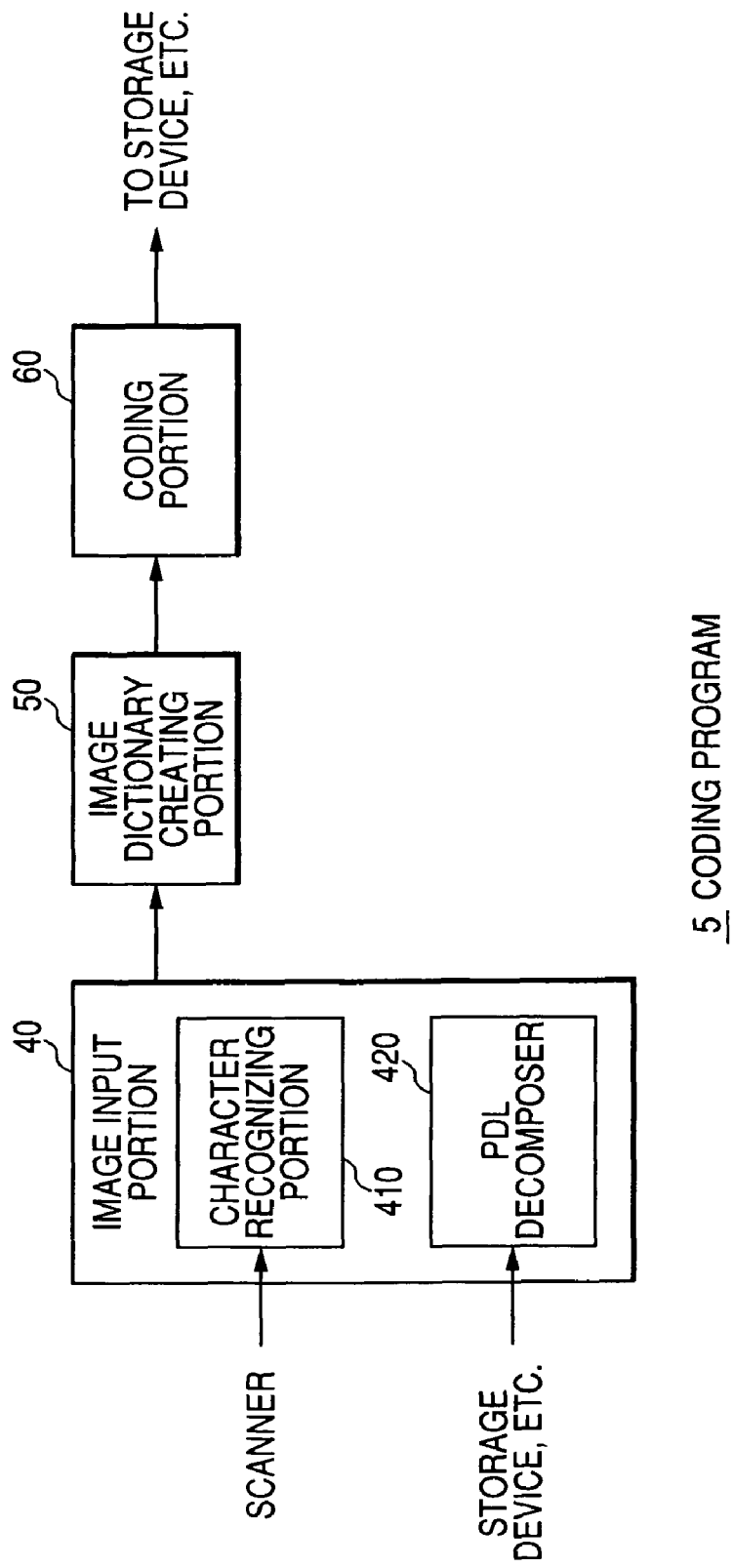
FIG. 4 is a view illustrating the functional structure of a coding program 5 executed by the controller 21 (FIG. 3) and realizing the image dictionary creating method according to first embodiment of the present invention.

FIG. 4 is a view illustrating the functional structure of the coding program 5 executed by the controller 20 (FIG. 3) and realizing the image dictionary creating method according to the present invention.

As illustrated in FIG. 4, the coding program 5 has an image input portion 40, an image dictionary creating portion 50 and a coding portion 60.

In the coding program 5, the image input portion 40 (information obtaining section) obtains the image data read by the scanner function of the printer 10 or the PDL (Page Description Language) image data obtained through the communication device 22, the storage device 24 or the like, converts the obtained image data into raster data and outputs the raster data to the image dictionary creating portion 50. Moreover, the image input portion 40 has a character recognizing portion 410 that recognizes character images from optically read image data or the like and a PDL decomposer 420 that analyzes PDL image data and generates raster data.

The character recognizing portion 410 recognizes the characters included in the inputted image data (hereinafter, referred to as input image), and outputs the character identification information of the recognized characters and the character area information of the recognized characters to the image dictionary creating portion 50 as the result of the character recognition processing. Here, the character identification information is information for identifying characters, and is, for example, versatile character codes (ASCII codes, shifted JIS codes, etc.) or a combination of a character code and a font type. The character area information is information representative of the areas of character images in an input image, and is, for example, the positions, the sizes or the ranges of the character images or a combination thereof.

The PDL decomposer 420 analyzes PDL image data and generates rasterized image data (raster data), and outputs the character identification information and the character area information of the character images in the generated image data together with the generated image data to the image dictionary creating portion 50.

The image dictionary creating portion 50 creates an image dictionary used for the coding processing of the input image based on the input image inputted from the image input portion 40, and outputs the created image dictionary and the input image to the coding portion 60. More specifically, the image dictionary creating portion 50 extracts the image patterns in units of character images from the input image based on the character identification information and the character area information inputted from the character recognizing portion 410 or the PDL decomposer 420, assigns indices to the extracted image patterns to create an image dictionary, and outputs the image dictionary to the coding portion 60.

The coding portion 60 (coding section) codes the input image based on the image dictionary inputted from the image dictionary creating portion 50, and outputs the coded input image and the image dictionary to the storage device 24 (FIG. 3), the printer 10 (FIG. 3) or the like. More specifically, the coding portion 60 compares the image patterns registered in the image dictionary and the partial images included in the input image with each other, and replaces the data of the partial images coinciding with or similar to any image patterns with the indices corresponding to the image patterns and the position information of the partial images. Further, the coding portion 60 may code the indices and the position information replaced with partial images, the image dictionary and the like by entropy coding (Huffman coding, arithmetic coding, LZ coding, etc.).

Figure 5:
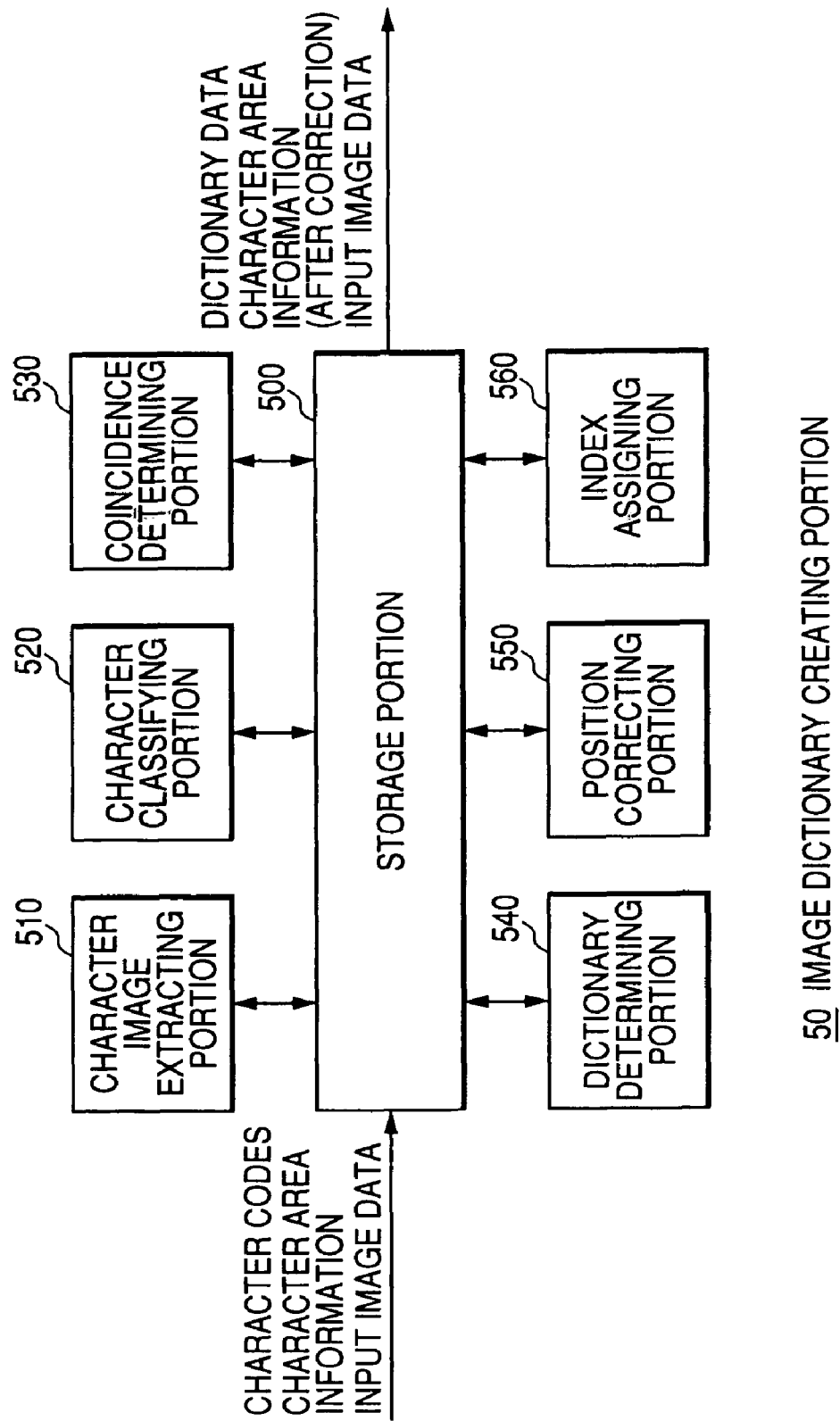
FIG. 5 is a view explaining the function of a first image dictionary creating portion 50 in more detail.

FIG. 5 is a view explaining the function of the first image dictionary creating portion 50 in more detail.

As shown in FIG. 5, the image dictionary creating portion 50 has a storage portion 500, a character image extracting portion 510, a character classifying portion 520, a coincidence determining portion 530, a dictionary determining portion 540 (typical pattern determining section), a position correcting portion 550 (area correcting section) and an index assigning portion 560 (identification information assigning section). The storage portion 500 controls the memory 204 (FIG. 3) and the storage device 24 (FIG. 3) to store the input image inputted from the image input portion 40 (FIG. 4), the character identification information and the character area information. Hereinafter, description will be given with character codes as a concrete example of the character identification information and the character position information as a concrete example of the character area information.

The character image extracting portion 510 extracts the character images from the input image based on the character position information. That is, the character image extracting portion 510 extracts the areas represented by the character area information from the input image as character images. The extracted character images are areas determined to be character images by the character recognizing portion 410. The character images may be outputted to the image dictionary creating portion 50 in a condition of being extracted from the input image by the character recognizing portion 410 or the PDL decomposer 420.

The character classifying portion 520 classifies the character images extracted from the input image into a plurality of character image groups based on the character codes. For example, the character classifying portion 520 classifies the character images whose character codes coincide with each other, into the same character image group.

The coincidence determining portion 530 compares a plurality of character images extracted from the input image with each other and determines the degree of coincidence. Here, the degree of coincidence is information representative of the extent to which a plurality of images coincide with each other, for example, in a case where binary images are compared, the number of overlapping pixels when two character images are overlaid one on another (hereinafter, referred to as the number of coinciding pixels), a coinciding pixel rate which is the number of coinciding pixels that is normalized (for example, the number of coinciding pixels divided by the total number of pixels), or the pixel distribution (histogram) when a plurality of character images are overlaid one on another.

Moreover, the coincidence determining portion 530 compares a plurality of character images at a plurality of relative positions and determines the degree of coincidence. That is, the coincidence determining portion 530 compares a plurality of character images while shifting them from each other in order to calculate the highest degree of coincidence.

For example, the coincidence determining portion 530 calculates the coinciding pixel rate while shifting two character images (character images whose character codes coincide with each other) classified into the same character image group, and outputs, to the storage portion 500, the highest value of the coinciding pixel rate and the shifting vector at the highest value.

The dictionary determining portion 540 determines the image patterns to be registered in the image dictionary based on the character images included in each character image group. That is, the dictionary determining portion 540 determines the image patterns to be registered based on a plurality of character images whose character codes coincide with each other. For example, the dictionary determining portion 540 selects the sum coupling pattern of a plurality of character images whose character codes coincide with each other (character images having undergone position correction described later) as the image pattern to be registered. The sum coupling pattern is the configuration of a union when a plurality of images are overlaid on each other.

The position correcting portion 550 corrects the position information of the character images based on the shifting vector outputted from the coincidence determining portion 530. That is, the position correcting portion 550 corrects the position information inputted from the image input portion 40 so that the degree of coincidence of a plurality of character images whose character codes coincide with each other is the highest.

The index assigning portion 560 assigns indices for identifying the image patterns to the image patterns determined based on the input image, associates the assigned indices with the image patterns, and outputs them to the storage portion 500.

Figure 6:
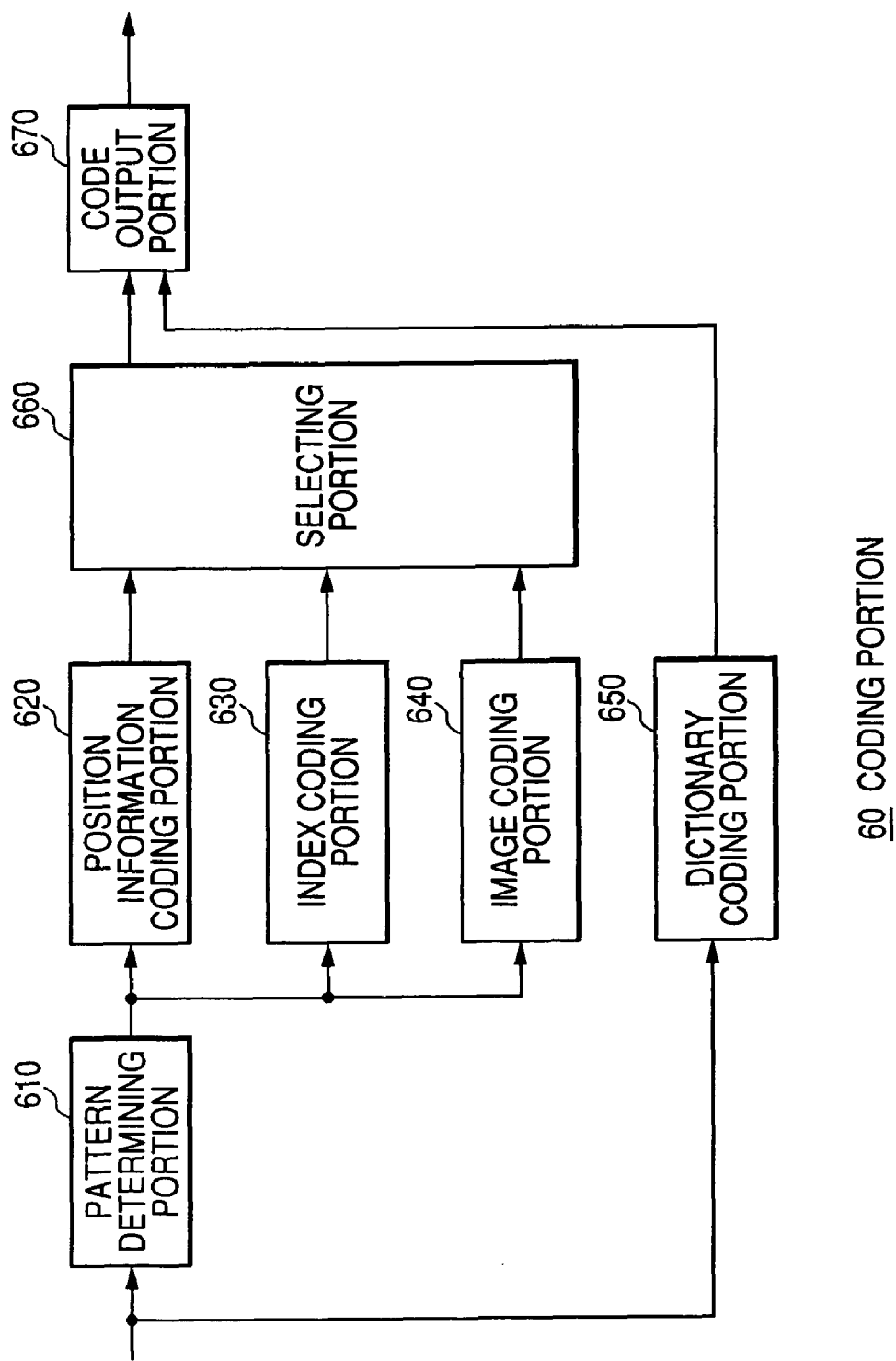
FIG. 6 is a view explaining the function of a coding portion 60 in more detail.

FIG. 6 is a view explaining the function of the coding portion 60 in more detail.

As shown in FIG. 6, the coding portion 60 has a pattern determining portion 610, a position information coding portion 620, an index coding portion 630, an image coding portion 640, a dictionary coding portion 650, a selecting portion 660 and a code output portion 670.

The pattern determining portion 610 compares the image patterns registered in the image dictionary with the partial images included in the input image, and determines the image patterns corresponding to the partial images (the same or similar image patterns). More specifically, the pattern determining portion 610 overlays the partial images (ones corrected by the position correcting portion 550) extracted in units of character images from the input image with the image patterns, calculates the degree of coincidence by the same method as that used by the coincidence determining portion 530 (FIG. 5), and determines whether the partial images correspond to the image patterns or not based on whether the calculated degree of coincidence is not less than a reference value or not.

When corresponding image patterns are found, the pattern determining portion 610 outputs the position information of the partial images to the position information coding portion 620 and outputs the indices of the image patterns to the index coding portion 630, and when no corresponding image patterns are found, the pattern determining portion 610 outputs the partial images to the image coding portion 640.

The position information coding portion 620 codes the position information inputted from the pattern determining portion 610 (that is, the position information of the partial images (character images) corrected by the position correcting portion 550), and outputs it to the selecting portion 660. For example, the position information coding portion 620 codes the position information by applying LZ coding, arithmetic coding or the like.

The index coding portion 630 codes the indices inputted from the pattern determining portion 610, and outputs them to the selecting portion 660. For example, the index coding portion 630 assigns, to each index, a code that is different in code length according to the frequency of occurrence of the index.

The image coding portion 640 codes the partial images inputted from the pattern determining portion 610 by applying a coding method appropriate to the images, and outputs the coded partial images to the selecting portion 660.

The dictionary coding portion 650 codes the image dictionary (image patterns and indices associated with each other) inputted from the image dictionary creating portion 50 (FIG. 4 and FIG. 5), and outputs it to the code output portion 670.

When image patterns corresponding to the partial images are found by the pattern determining portion 610, the selecting portion 660 associates the coded data of the position information inputted from the position information coding portion 620 with the coded data of the indices inputted from the index coding portion 630 and outputs them to the code output portion 670, and when no image patterns corresponding to the partial images are found by the pattern determining portion 610, the selecting portion 660 outputs the coded data of the partial images coded by the image coding portion 640 to the code output portion 670.

The code output portion 670 associates the coded data inputted from the selecting portion 660 (the coded data of the position information, the indices and the partial images) with the coded data inputted from the dictionary coding portion 650 (the coded data of the image dictionary) and outputs them to the printer 10 (FIG. 3), the storage device 24 (FIG. 3) or the communication device 22 (FIG. 3).

Next, the general operation of the coding processing by the image processor 2 will be described.

Figure 7:
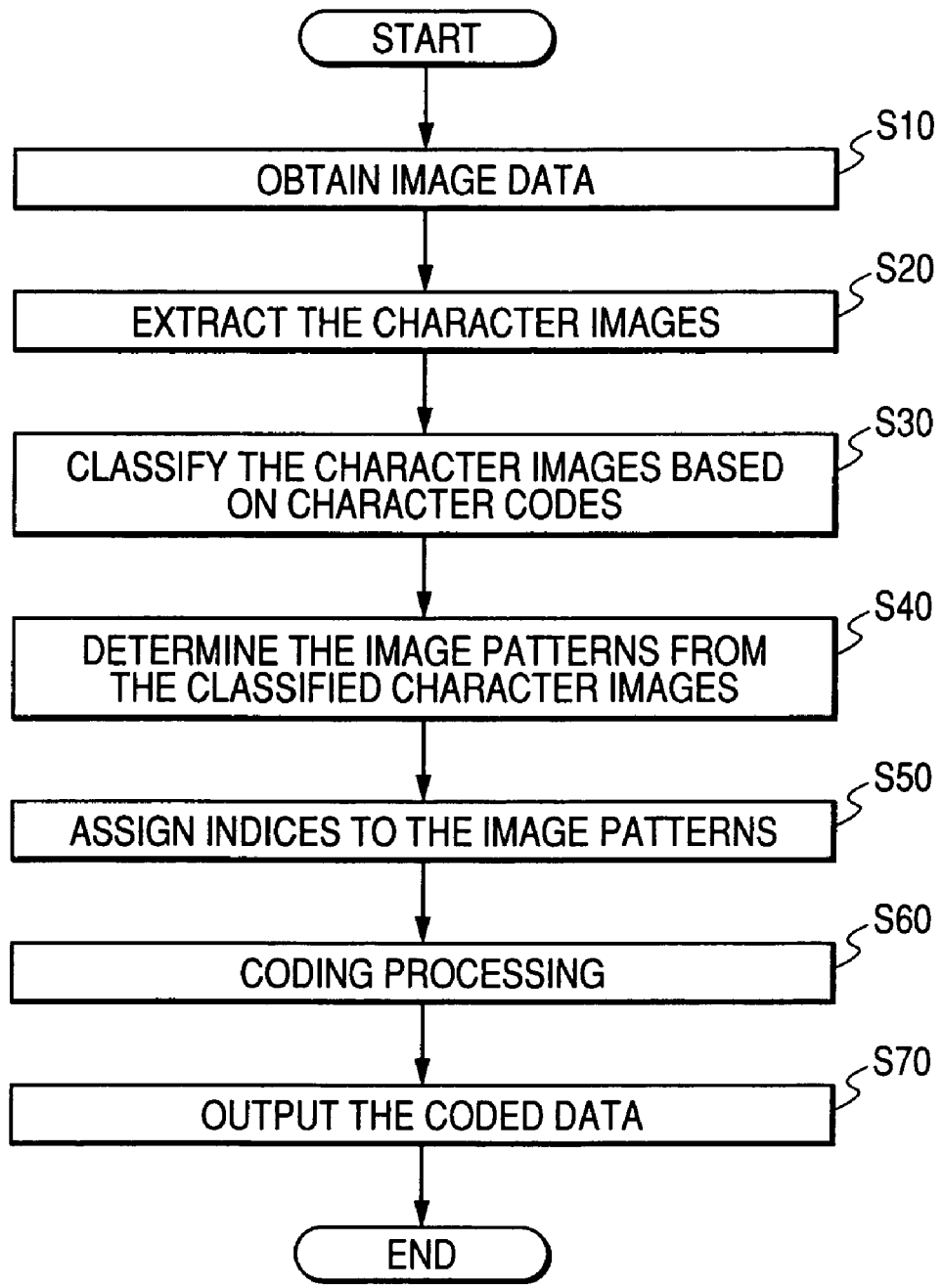
FIG. 7 is a flowchart showing a first operation (S1) of the coding program 5.

FIG. 7 is a flowchart showing a first operation (S1) of the coding program 5. This flowchart will be described with the following case as a concrete example: a case where binary image data optically read by the scanner function of the printer 10 is inputted.

As shown in FIG. 7, at step 10 (S10), when image data (binary) is inputted from the printer 10 (FIG. 3), the image input portion 40 outputs the inputted image data (input image) to the image dictionary creating portion 50. The character recognizing portion 410 (FIG. 4) of the image input portion 40 performs character recognition processing on the input image, determines the character codes and the position information of the character images included in the input image, and outputs the determined character codes and position information to the image dictionary creating portion 50.

At step 20 (S20), the storage portion 500 of the image dictionary creating portion 50 stores the input image inputted from the image input portion 40, the character codes and the position information into the memory 204 (FIG. 3).

The character image extracting portion 510 determines the range of the character images in the input image based on the position information stored by the storage portion 500, extracts the character images from the determined range, and stores them into the storage portion 500. The character image extraction is performed on the entire area of the input image to be coded (for example, one page or one document).

At step 30 (S30), the character classifying portion 520 classifies the character images extracted by the character image extracting portion 510, based on the character codes inputted from the character recognizing portion 410 (FIG. 4).

At step 40 (S40), the coincidence determining portion 530, the dictionary determining portion 540 and the position correcting portion 550 cooperate to determine the image patterns registered in the image dictionary based on the character images classified based on the character classifying portion 520 and store the determined image patterns into the storage portion 500 as the image dictionary.

At step 50 (S50), the index assigning portion 560 assigns indices to the determined image patterns, associates the assigned indices with the image patterns and stores them into the storage portion 500. The assigned indices at least uniquely identify the image patterns with respect to all the input images inputted as the objects of coding.

When the image pattern determination and the index assignment are finished with respect to all the input images inputted as the objects of coding, these image patterns and indices are outputted to the coding portion 60 as the image dictionary.

At step 60 (S60), the coding portion 60 compares the image patterns registered in the image dictionary and the partial images included in the input image, and when partial images coinciding with the image patterns are present, the coding portion 60 codes the partial images after replacing them with indices and position information, and codes the partial images not coinciding with the image patterns as they are. Moreover, the coding portion 60 codes the image dictionary.

At step 70 (S70), the coding portion 60 outputs the coded data of the indices, the position information and the partial images and the coded data of the image dictionary to the printer 10 or the like.

Figure 8:
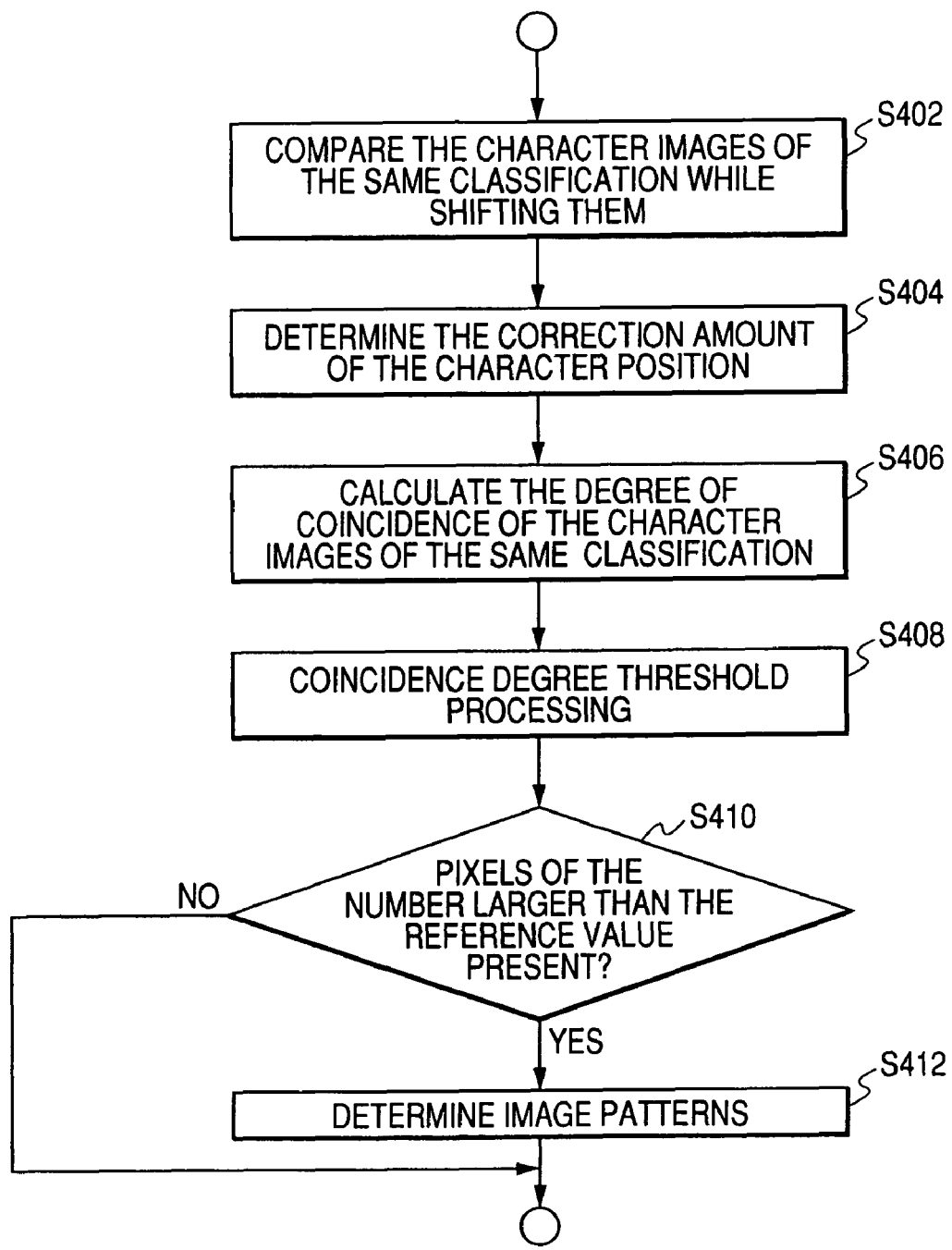
FIG. 8 is a flowchart explaining a first image pattern determination processing (S40) in more detail.

FIG. 8 is a flowchart explaining the first image pattern determination processing (S40) in more detail.

As shown in FIG. 8, at step 402 (S402), the coincidence determining portion 530 compares the character images classified based on character codes with each other, and determines the degree of coincidence at a plurality of relative positions. Specifically, the coincidence determining portion 530 creates the pixel distribution (histogram) of the black pixels in the character image group, and calculates the number of coinciding pixels of the black pixels while shifting the created pixel distribution and the character images included in the character image group from each other. The pixel distribution is a histogram in which the pixel values of the black pixels of the character images belonging to the character image group are successively added for each area at the relative position where the number of coinciding pixels is largest.

That is, when the pixel distribution of the character image group is $Q(x)$, the pixel value of each character image is $P(i, x)$, the position vector is x, each character image belonging to the character image group is i(1 to N: N is the number of character images belonging to the character image group) and the shifting vector of the character image i is vi, the coincidence determining portion 530 calculates the number of coinciding pixels by the following expression:

(The number of coinciding pixels $K$)=$\Sigma\{Q(x)*P(i,x-vi)\}$ ($\Sigma$ represents the sum total with respect to the variable x)
When i=1, $Q(x)=P(1,x)$, and when i>1, $Q(x)=P(1,x)+P(2,x-v2)+\ldots+P(i-1,x-v(i-1))$.

At step 404 (S404), the position correcting portion 550 determines the correction vector of the position information inputted from the character recognizing portion 410 based on the number of coinciding pixels (the degree of coincidence) calculated at a plurality of relative positions by the coincidence determining portion 530. Specifically, the position correcting portion 550 selects, as the correction vector, the shifting vector vi when the number of coinciding pixels K calculated by the coincidence determining portion 530 becomes highest (the two-dimensional vector where the character image is displaced with respect to the position information inputted from the character recognizing portion 410).

At step 406 (S406), the coincidence determining portion 530 compares a plurality of character images classified into the same character image group (ones position-corrected by the correction vector), and calculates the degree of coincidence of the pixel values in each area. Specifically, the coincidence determining portion 530 overlays all the character images included in the character image group at the relative position where the number of coinciding pixels is largest, and adds the black pixels in each area to create the pixel distribution (histogram). That is, the coincidence determining portion 530 calculates Q(x) by the following expression with respect to all the character images (1 to N) included in each character image group:

$$Q(x) = \Sigma P(i, x - vi)$$

At step 408 (S408), the dictionary determining portion 540 performs threshold processing to remove the distribution number not more than the threshold value, on the degree of coincidence (pixel distribution) calculated by the coincidence determining portion 530. Specifically, the dictionary determining portion 540 normalizes Q(x) calculated by the coincidence determining portion 530 to calculate Q'(x) and performs the threshold processing on the calculated Q'(x). That is, the dictionary determining portion 540 calculates the distribution probability Q'(x) by the following expression:

$$Q'(x) = Q(x)/N$$

Then, by the following conditional expression, the coincidence determining portion 530 removes the part where the distribution probability Q'(x) is lower than the reference value, and calculates Q''(x):

when $Q'(x) >$ a threshold value $A, Q''(x)=1$, and in the other cases, $Q''(x)=0$ At step 410 (S410), with respect to the pixel distribution after the threshold processing, the dictionary determining portion 540 determines whether the area where the distribution number is not 0 (the black pixel area) is larger than the reference or not. When the area is not less than the reference, the process shifts to the processing of S412, and when the area is smaller than the reference, with respect to the character image group, the image pattern determination processing (S40) is finished without the image patterns being registered.

Specifically, the dictionary determining portion 540 determines whether the number of pixels where the above-mentioned Q''(x) is 1 is not less than the reference value or not. The dictionary determining portion 540 performs image pattern registration when the number is not less than the reference value, and does not perform image pattern registration when the number is smaller than the reference value.

At step 412 (S412), the dictionary determining portion 540 determines the image patterns based on the pixel distribution. Specifically, the dictionary determining portion 540 determines the patterns of Q''(x) as the image patterns to be registered in the image dictionary.

FIG. 9 is a flowchart explaining the coding processing (S60) in more detail. This flowchart will be described with the following case as a concrete example: a case where the coding processing is performed based on the image patterns determined in FIG. 8.

As shown in FIG. 9, at step 602 (S602), the pattern determining portion 610 compares the partial images extracted from the input image based on the position information after correction (that is, character images) and the image patterns registered in the image dictionary, and calculates the number of coinciding pixels. The pattern determining portion 610 may obtain the number of coinciding pixels from the coincidence determining portion 530.

At step 604 (S604), the pattern determining portion 610 determines whether coinciding image patterns are present or not. Specifically, the pattern determining portion 610 determines whether the number of coinciding pixels calculated with respect to each image pattern is within the permissible range (for example, not less than 90% of all the pixels of the partial image) or not. When the number is within the permissible range, the process shifts to the processing of S606, and when the number is outside the permissible range, the process shifts to the processing of S610.

At step 606 (S606), the pattern determining portion 610 reads out the index of, of the image patterns whose numbers of coinciding pixels are within the permissible range, the image pattern whose number of coinciding pixels is the largest from the image dictionary, outputs the read index to the index coding portion 630, and outputs the position information (one corrected by the position correcting portion 550) of the character image to the position information coding portion 620.

The index coding portion 630 codes the index inputted from the pattern determining portion 610, and outputs the coded data of the index to the selecting portion 660.

At step 608 (S608), the position information coding portion 620 codes the position information inputted from the pattern determining portion 610, and outputs the coded data of the position information to the selecting portion 660.

The selecting portion 660 associates the coded data of the index inputted from the index coding portion 630 and the coded data of the position information inputted from the position information coding portion 620 with each other, and outputs them to the code output portion 670. That is, the selecting portion 660 outputs, to the code output portion 670, the index and the position information so as to be associated with each other for each partial image.

At step 610 (S610), the pattern determining portion 610 outputs the partial image (that is, the character image whose corresponding image pattern is absent in the image dictionary) to the image coding portion 640.

The image coding portion 640 codes the image data of the partial image inputted from the pattern determining portion 610, and outputs the coded data of the partial image to the selecting portion 660.

The selecting portion 660 outputs the coded data of the partial image inputted from the image coding portion 640 to the code output portion 670.

At step 612 (S612), the pattern determining portion 610 determines whether the coding processing is finished with respect to all the partial images or not. When a partial image that is not coded is present, the process returns to the processing of S602 to perform the coding processing of the next partial image, and when all the partial images are coded, the process shifts to the processing of S614.

At step 614 (S614), the dictionary coding portion 650 codes the image dictionary (one in which the image patterns and the indices are associated with each other) inputted from the image dictionary creating portion 50, and outputs the coded data of the image dictionary to the code output portion 670.

As described above, in the image processor 2 of the present embodiment, since the image patterns are determined based on the character image groups classified based on character codes and are registered in the image dictionary, efficient coding (coding of a high compression rate) is realized while the readability of document images is maintained.

Moreover, in the image processor 2, since the character images belonging to the same character image group are compared with each other to correct the extraction position of the character images (the position information of the character images), the character image shift caused by a character image extraction error, a font difference or the like is corrected, so that the positions of the characters can be reproduced with high accuracy. While in the present embodiment, the image processor 2 classifies the character images into character image groups based on character codes, it may classify the character images by use of another character identification information such as the font type or the character image size, or may classify the character images by combining at least two of the character codes, the font type and the character image size.

Next, a first modification of the above-described embodiment will be described.

FIG. 10 is a view illustrating character images that can be determined as the same character code by the character recognition processing.

Figure 10A:
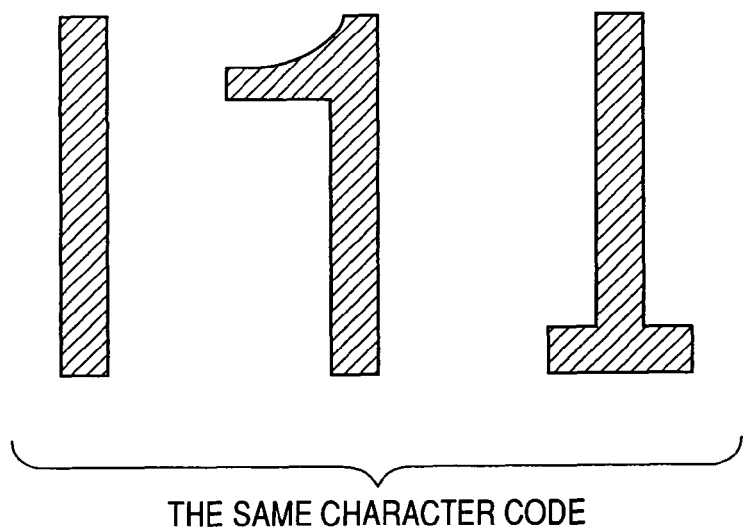
FIG. 10 is a view illustrating character images that can be determined as the same character code by a character recognition processing.

As illustrated in FIG. 10(A), numeric characters "1" in different fonts can be determined as the same character code by the character recognizing portion 410. Therefore, in the above-described embodiment, these plurality of numeric characters "1" in different fonts are classified into the same character image group, and one image pattern is registered based on these character images. However, these numeric characters "1" have different shapes, and there are cases where it is intended to reproduce the shape differences in the decoded image. Moreover, characters that are different only in size can be determined as the same character code, and there are cases where it is intended to reproduce the size difference.

Figure 10B:
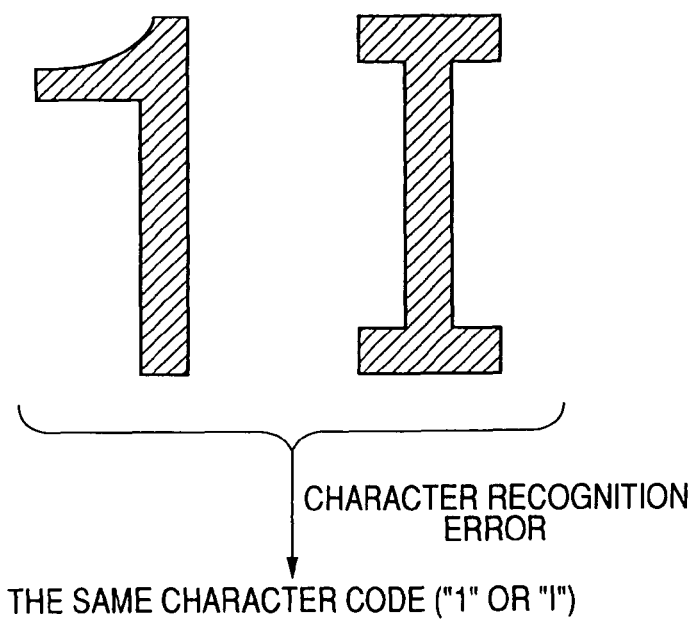

Moreover, as illustrated in FIG. 10(B), characters having similar shapes (for example, a numeric character "1" and a capital letter "I" of the alphabet) can be determined as the same character code because of a character recognition error. In this case, although the influence on the readability is not very large since at least the shapes are similar, there are cases where it is intended to reproduce them so as to be distinguished from each other.

Accordingly, the image processor 2 of the first modification enables the following: When character images having different shapes are mixed in the character image groups classified based on character codes, at least two image patterns are determined with respect to the character image groups and the image patterns are registered in the image dictionary.

Figure 11:
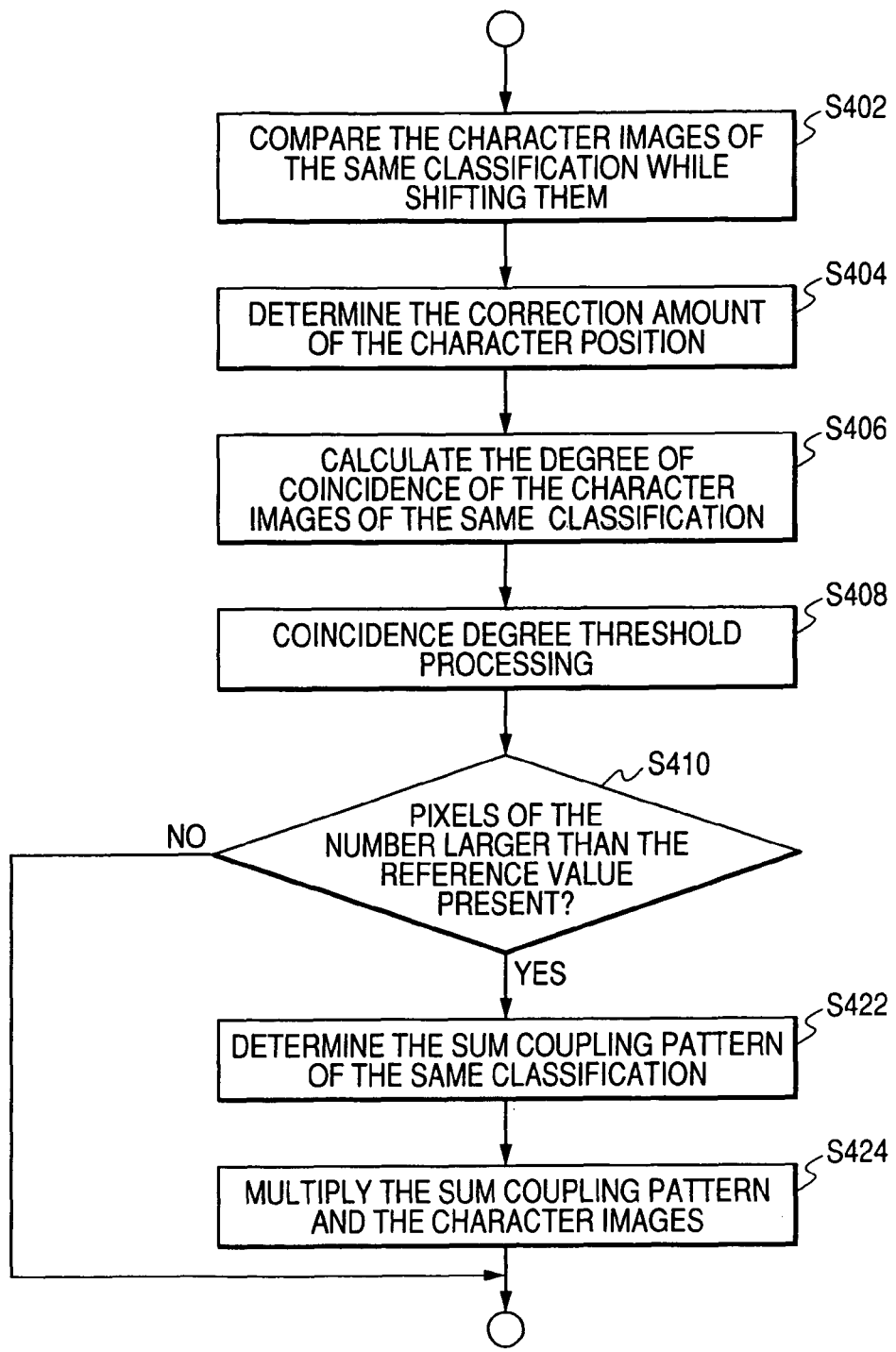
FIG. 11 is a flowchart of a second image pattern determination processing (S42)

FIG. 11 is a flowchart of a second image pattern determination processing (S42). Of the processings in this figure, substantially the same processings as those shown in FIG. 8 are denoted by the same reference numerals.

As shown in FIG. 11, at S410, the dictionary determining portion 540 determines whether the area where the distribution number is not 0 (the black pixel area) is larger than the reference or not with respect to the pixel distribution after the threshold processing. When the area is not less than the reference, the process shifts to the processing of S422, and when the area is smaller than the reference, with respect to the character image group, the image pattern determination processing (S42) is finished without the image patterns being registered.

At step 422 (S422), the dictionary determining portion 540 determines the sum coupling pattern Q"(x) based on the pixel distribution.

At step 424 (S424), the dictionary determining portion 540 extracts, as a common pattern, the part (intersection) common to the sum coupling pattern Q"(x) and the character images belonging to the character image group, and determines the extracted common pattern as the image pattern. The dictionary determining portion 540 does not register all the common patterns extracted based on the character images in the image dictionary but registers them in the image dictionary while excluding overlapping common patterns. Moreover, the dictionary determining portion 540 may exclude, of a plurality of common patterns extracted based on the character images, ones where the difference in the black pixel area is not more than the threshold value, as overlapping patterns.

Figure 12:
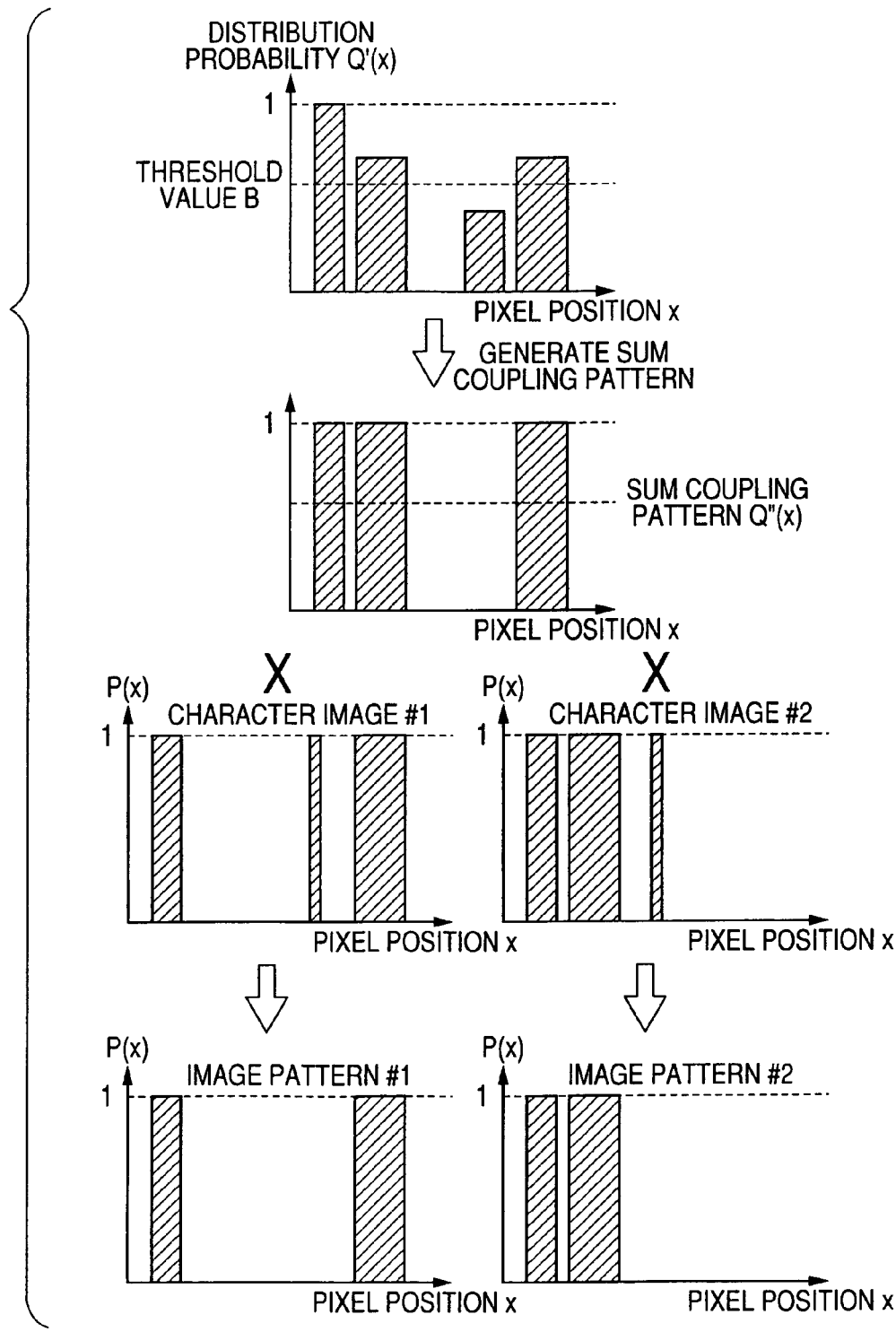
FIG. 12 is a view schematically explaining an image pattern determining method according to a first modification of the first embodiment.

FIG. 12 is a view schematically explaining an image pattern determining method according to the first modification.

As shown in FIG. 12, the distribution probability Q'(x) of the black pixels of the character images classified based on character codes takes a different numeric value according to the pixel position x. This is because character images having different shapes are mixed in the character image group. The part, where the distribution probability is low, of the distribution probability Q'(x) is removed by the threshold processing being performed based on a threshold value B. By this, only typical patterns can be set as image patterns by excluding the different shape (the difference from characters occurring at high frequency), the noise part and the like of the characters occurring at low frequency.

The dictionary determining portion 540 generates, at the above-described S422, a sum coupling pattern Q"(x) where the part not less than a threshold value B is 1 and the part less than the threshold value B is 0.

Then, the dictionary determining portion 540 extracts, at S424, the parts common to the sum coupling pattern Q"(x) and the character images belonging to the character image group as common patterns. That is, the dictionary determining portion 540 multiplies the sum coupling pattern Q"(x) and the pixel distribution P(i, x−vi) of each character image. By this, an image pattern #1 and an image pattern #2 which are typical character images being present in a plurality of numbers in the character image group are extracted.

As described above, the image processor 2 according to the first modification is capable of determining a plurality of typical image patterns based on a plurality of image characters classified as having the same character code. By this, when the frequency of occurrence is high, character images of different fonts, sizes and the like are also registered in the image dictionary as image patterns, and these character images are reproduced in the decoded image.

Next, a second modification of the above-described embodiment will be described.

FIG. 13 is a view illustrating the common shapes and the different shapes of a plurality of character images that can be determined as the same character code.

Figure 13A:
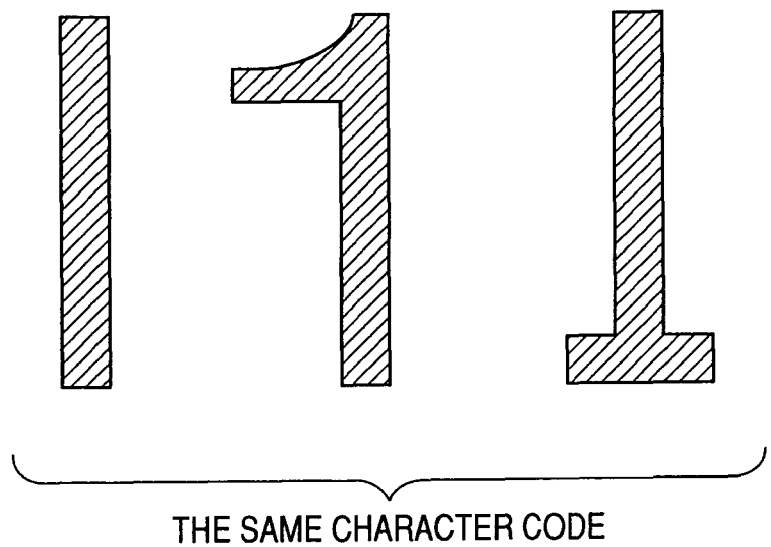
FIG. 13 is a view illustrating the common shapes and the different shapes of a plurality of character images that can be determined as the same character code.

As illustrated in FIG. 13(A), the numeric characters "1" in different fonts can be determined as the same character code by the character recognizing portion 410. Like this, the character image group classified based on character codes have the same shape for the most part. Hereinafter, a partial image common to a plurality of character images belonging to a character image group will be referred to as a common shape, and a partial image which is the difference between each character image and the common shape will be referred to as a different shape.

Figure 13B:
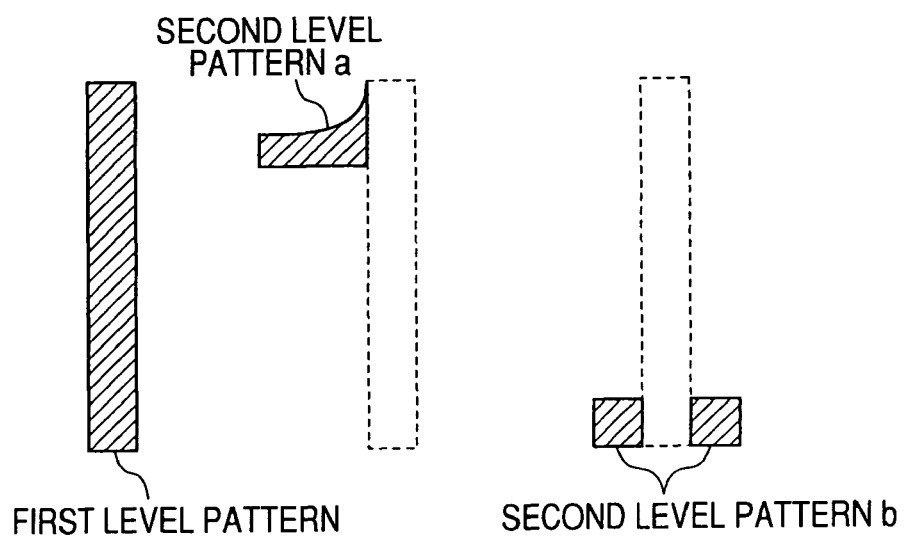

As illustrated in FIG. 13B, of the partial shapes constituting these character images, a first level pattern which is the common shape of these character images is particularly high in the frequency of occurrence. A second level pattern a and a second level pattern b which are partial shapes particular to the character images are low in the frequency of occurrence compared to the first level pattern.

Accordingly, in the second image processor 2 according to the second modification, when a plurality of character images having different shapes are mixed in the character image groups classified based on character codes, the common shapes and the different shapes of these character images are hierarchically registered in the image dictionary as image patterns.

Figure 14:
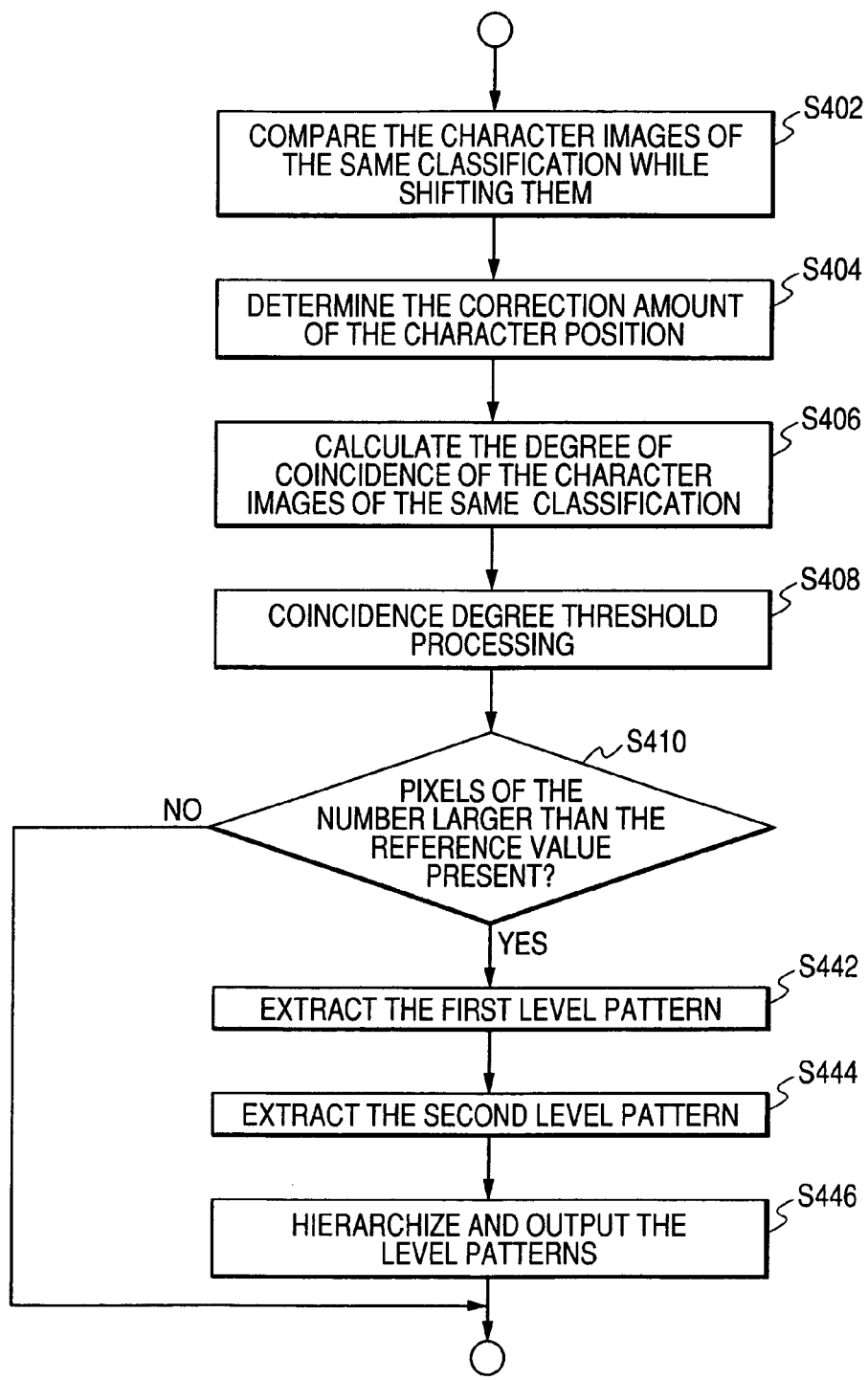
FIG. 14 is a flowchart of a third image pattern determination processing (S44)

FIG. 14 is a flowchart of a third image pattern determination processing (S44). Of the processings in this figure, substantially the same processings as those shown in FIG. 8 are denoted by the same reference numerals.

As shown in FIG. 14, at S410, the dictionary determining portion 540 determines whether the area where the distribution number is not 0 (the black pixel area) is larger than the reference or not with respect to the pixel distribution after the threshold processing. When the area is not less than the reference, the process shifts to the processing of S442, and when the area is smaller than the reference, with respect to the character image group, the image pattern determination processing (S44) is finished without the image patterns being registered.

At step 442 (S442), the dictionary determining portion 540 extracts a part higher in the distribution probability Q'(x) than a first level threshold value as the image pattern of the common shape (that is, the first level pattern). Here, the first level threshold value is a reference for separating the common shape common to the character images belonging to the character image group and the other shapes, and in this example, is a distribution probability when black pixels are present in substantially all the character images belonging to the character image group (0.95. etc.).

At step 444 (S444), the dictionary determining portion 540 generates a distribution probability Q1(x) where the part corresponding to the first level pattern is removed from the distribution probability Q'(x) by making the part corresponding to the first level pattern 0.

Then, the dictionary determining portion 540 generates a sum coupling pattern Q1"(x) where the first level pattern is removed by making the part not less than the second level threshold value 1 and making the part lower than the second level threshold value 0 in the distribution probability Q1(x) Here, the second level threshold value is a reference for separating one which is a different shape included in each character image as the difference of the common shape and is high in the frequency of occurrence in the character image group. The second level threshold value is lower than the first level threshold value, and is set, for example, according to the target code amount and image quality.

The dictionary determining portion 540 multiplies the sum coupling pattern Q1" and the pixel distribution P(i, x–vi) of each character image, extracts Ri(x) which is the part common to these, and determines the extracted Ri(x) as the image pattern of the different shape (that is, the second level pattern).

At step 446 (S446), the dictionary determining portion 540 registers the first level pattern and the second level pattern generated from the first character image group in the image dictionary so as to be associated with each other. More specifically, the dictionary determining portion 540 registers the first level pattern and the second level pattern in the image dictionary so as to be hierarchically associated with each other based on their indices.

Figure 15:
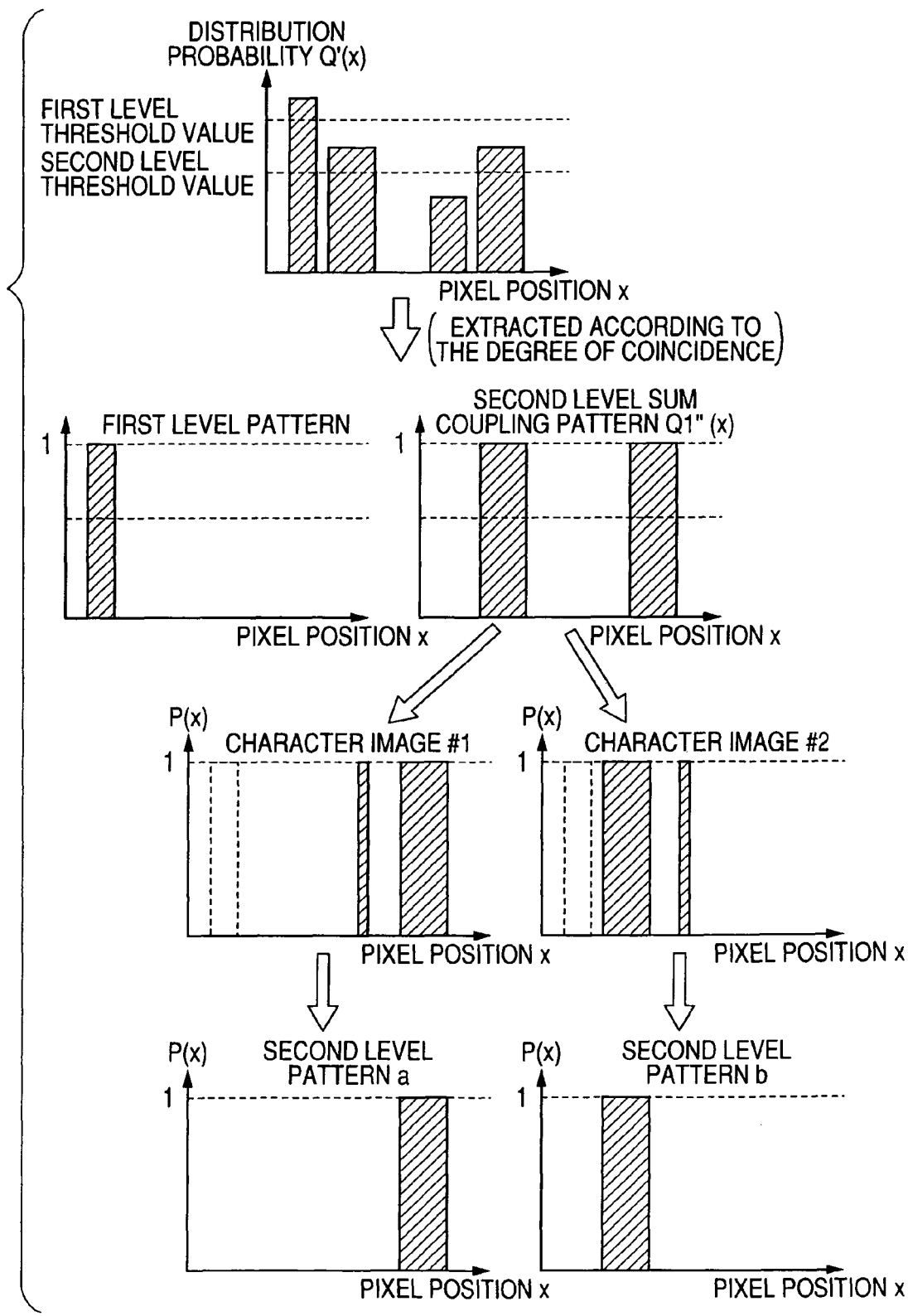
FIG. 15 is a view schematically explaining an image pattern determining method according to a second modification of the first embodiment.

FIG. 15 is a view schematically explaining an image pattern determining method according to the second modification.

As shown in FIG. 15, the distribution probability Q' (x) of the black pixels of the character images classified based on character codes takes a different numeric value according to the pixel position x. Of this, the part where the distribution probability is highest is considered to be a shape common to the character images belonging to the character image group (that is, the common shape). The remaining areas where a distribution probability is present are considered to be shapes corresponding to the difference between the character images and the common shape (that is, the different shapes).

The dictionary determining portion 540 has the first level threshold value for extracting the common shape (the area where the distribution probability is substantially highest) and the second level threshold value for extracting the different shape occurring at high frequency.

First, the dictionary determining portion 540 performs the threshold processing on the distribution probability Q'(x) by the first level threshold value, and extracts the part corresponding to the first level pattern (common shape). Then, the part corresponding to the extracted first level pattern is removed from the distribution probability Q'(x) and converted into "1" or "0" with the second level threshold value as the reference, thereby generating a second level sum coupling pattern Q1"(x).

The dictionary determining portion 540 multiplies the second level sum coupling pattern Q1"(x) and the pixel distribution p(i, x) of each character image i to thereby extract the second level pattern which is their common part. In this example, the common part of the second level sum coupling pattern Q1"(x) and the "character image #1" is the second level pattern a, and the common part of the second level sum coupling pattern Q1" (x) and the "character image #2" is the second level pattern b.

By this, the "character image #1" can be replaced with the index as the sum of the first level pattern and the second level pattern a, and the "character image #2"•can be replaced with the index as the sum of the first level pattern and the second level pattern b.

Figure 16:
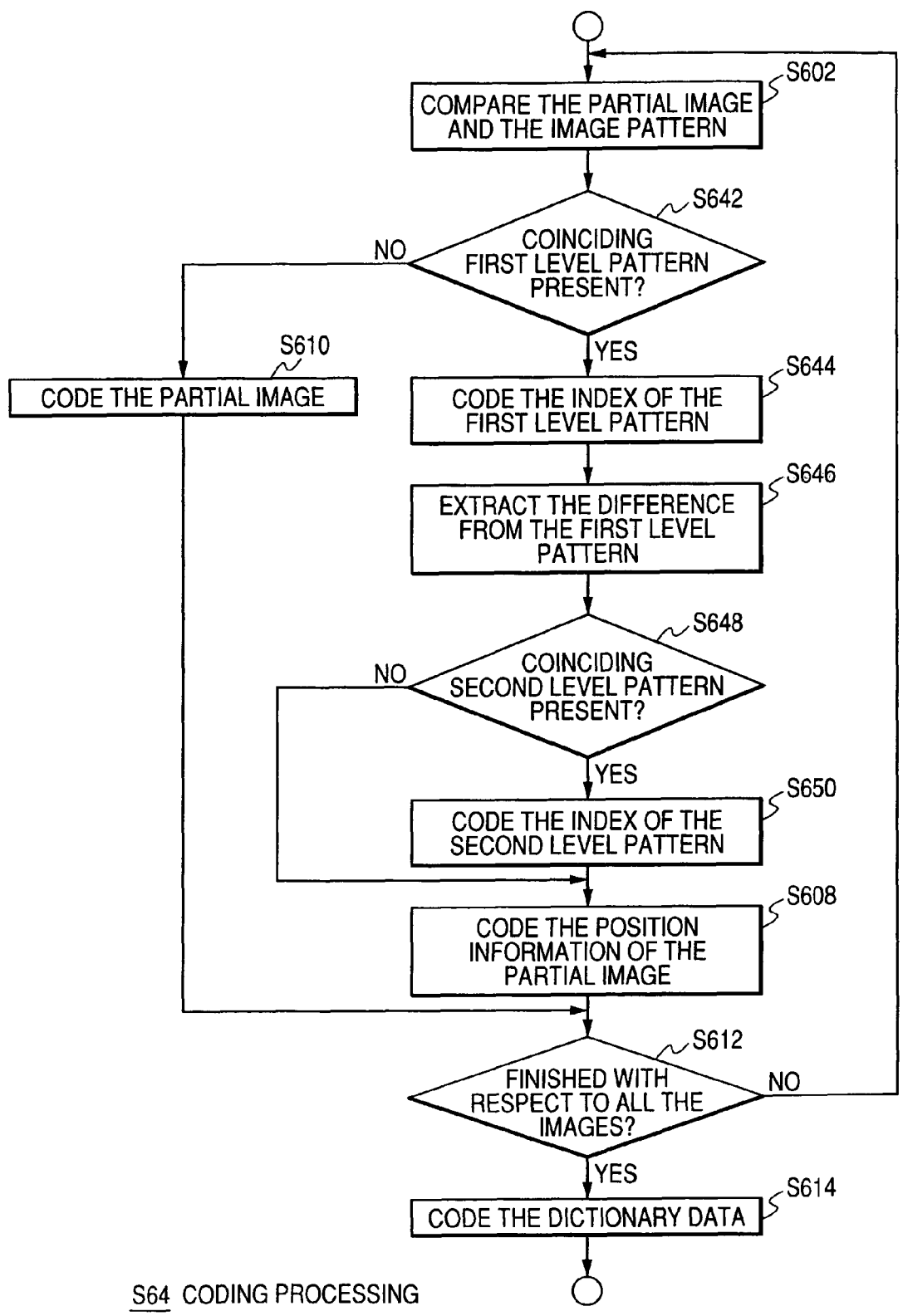
FIG. 16 is a flowchart of a coding processing (S64) according to the second modification.

FIG. 16 is a flowchart of the coding processing (S64) according to the second modification. Of the processings in this figure, substantially the same processings as those shown in FIG. 9 are denoted by the same reference numerals.

As shown in FIG. 16, at S602, the pattern determining portion 610 compares the partial images (that is, the character images) extracted from the input image based on the corrected position information with the first level pattern registered in the image dictionary, and calculates the number of coinciding pixels.

At step 642 (S642), the pattern determining portion 610 determines whether the first level pattern that coincides with the inputted partial image is present or not. Specifically, the pattern determining portion 610 determines whether the number of coinciding pixels calculated with respect to each first level pattern is within the permissible range (for example, not less than 90% of all the pixels of the partial image) or not. When the number is within the permissible range, the process shifts to the processing of S644, and when the number is outside the permissible range, the process shifts to the processing of S610.

At step 644 (S644), the pattern determining portion 610 reads out the index of, of the first level patterns whose numbers of coinciding pixels are within the permissible range, the first level pattern whose number of coinciding pixels is the largest from the image dictionary, outputs the read index to the index coding portion 630, and outputs the position information (one corrected by the position correcting portion 550) of the character image to the position information coding portion 620.

At step 646 (S646), the pattern determining portion 610 extracts the different shape between the shape of the first level pattern and the inputted partial image.

At step 648 (S648), the pattern determining portion 610 reads out the second level pattern associated with the first level pattern from the image dictionary, compares the read second level pattern with the extracted different shape, and calculates the number of coinciding pixels. The pattern determining portion 610 determines whether the number of coinciding pixels calculated with respect to each second level pattern is within the permissible range (for example, not less than 90% of all the pixels of the different shape) or not. When the number is within the permissible range, the process shifts to the processing of S650, and when the number is outside the permissible range, the process shifts to the processing of S608.

At step 650 (S650), the pattern determining portion 610 reads out the index of, of the second level patterns whose numbers of coinciding pixels are within the permissible range, the second level pattern whose number of coinciding pixels is the largest from the image dictionary, associates the read index with the index of the first level pattern, and outputs it to the index coding portion 630.

While the black pixels coinciding with none of the first level pattern and the second level pattern are removed as noise or the like in this example, these black pixels themselves may be coded separately.

As described above, in the image processor 2 according to the second modification, a plurality of character images classified as having the same character code are compared with each other, the common shape and the different shape are extracted, and the extracted common shape and different shape are hierarchically associated with each other and registered in the image dictionary. By this, the reproducibility of the character images can be improved while a high compression rate is realized.

Moreover, the image processor 2 is capable of realizing progressive transmission that gradually improves the image quality according to the amount of coded data decoded on the decoding side by hierarchizing the common shape and the different shape and outputting them successively from the coded data of the common shape.

Next, a third modification of the above-described embodiment will be described.

The correctness (accuracy) of the character recognition by the character recognizing portion 410 sometimes differs among the character images included in the input image. Therefore, there is a possibility that character images whose shapes are not similar are mixed in the character image groups classified based on the character recognition result (character codes) When character images whose shapes are not similar are mixed in the character image groups like this, a problem can occur such that the image patterns registered in the image dictionary are distorted.

Accordingly, the image processor 2 according to the third modification creates an image dictionary for each accuracy of the character recognition processing.

FIG. 17 is a view illustrating the image dictionary created for each accuracy of the character recognition processing.

As illustrated in FIG. 17, the character classifying portion 520 according to the third modification obtains the accuracy of the character recognition processing from the character recognizing portion 410, and classifies the character images included in the input image according to the obtained accuracy. The character classifying portion 520 of this example classifies the character images according to the range of accuracy such as a character image group with an "accuracy of not less than 90%," a character image group with an "accuracy of not less than 70% and less than 90%," and a character image group with an "accuracy of less than 70%."

Further, the character classifying portion 520 further classifies each character image group based on character codes.

For each of the character image groups classified based on the accuracy and character codes, the coincidence determining portion 530 compares the character images included in the character image group with each other and determines the degree of coincidence. The dictionary determining portion 540 determines the image pattern for each of the character image groups classified based on the accuracy and character codes. When the image pattern is determined with respect to a character image group with low accuracy, the dictionary determining portion 540 first compares the image pattern determined with respect to a character image group with high accuracy with the character images belonging to this character image group (the character image group with low accuracy), and determines whether these coincide with each other or not. When they coincide with each other, the character image is excluded from the character image group.

As described above, the image processor 2 according to the third modification is capable of minimizing the influence of a character recognition processing error on the image dictionary by creating the image dictionary for each accuracy of the character recognition processing.

Next, a second embodiment will be described.

While the image dictionary creating portion 50 creates the image dictionary by using all the character images of one page or one document in the above-described first embodiment, a second image dictionary creating portion 52 according to the present embodiment compares the character images one character at a time and registers them in the image dictionary.

Figure 18:
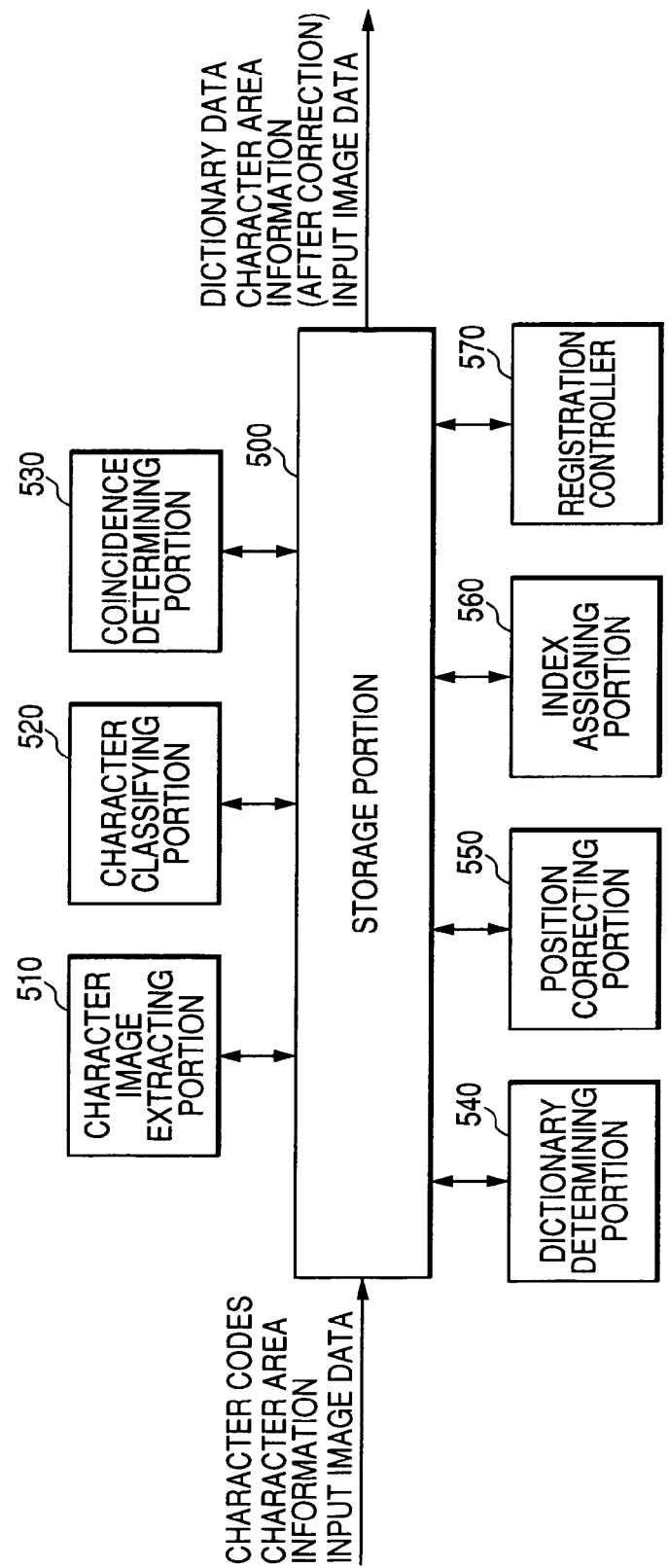
FIG. 18 is a view explaining the functional structure of a second image dictionary creating portion 52.

FIG. 18 is a view explaining the functional structure of the second image dictionary creating portion 52.

As shown in FIG. 18, the image dictionary creating portion 52 according to the second embodiment has a registration controller 570 in addition to the elements of the first image dictionary creating portion 50 shown in FIG. 5.

The registration controller 570 controls new registration in the image dictionary by determining whether to register the character image extracted by the character image extracting portion 510 in the image dictionary as an image pattern or not. More specifically, the registration controller 570 determines whether to register the newly inputted character image in the image dictionary as an image pattern or not based on the degree of coincidence between the newly inputted character image and the image patterns registered in the image dictionary. For example, when the degrees of coincidence between the already registered image patterns and the newly inputted character image are all equal to or less than the reference, the registration controller 570 instructs the dictionary determining portion 540 to register this character image in the image dictionary as the image pattern.

Figure 19:
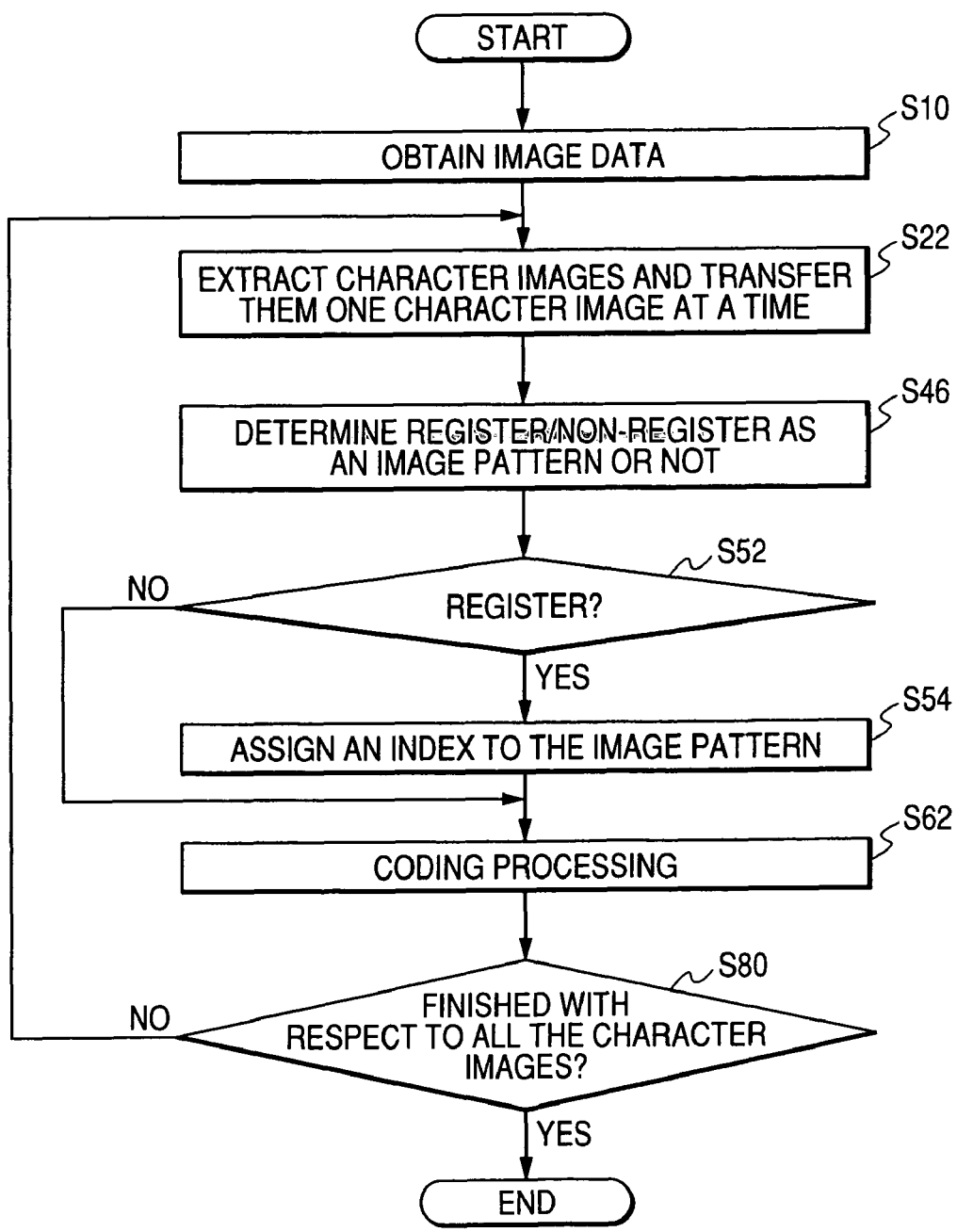
FIG. 19 is a flowchart showing a second operation (S2) of the coding program 5 according to a second embodiment.

FIG. 19 is a flowchart showing a second operation (S2) of the coding program 5 according to the second embodiment. In this flowchart, the following case will be described as a concrete example: a case where the character recognizing portion 410 (FIG. 4) determines the positions and the character codes of the character images included in the input image one character at a time and extracts the character images (binary) one character at a time. Of the processings shown in this figure, substantially the same processings as those shown in FIG. 7 are denoted by the same reference numerals.

As shown in FIG. 19, at S10, when image data (binary) is inputted from the printer 10 (FIG. 3), the image input portion 40 outputs the inputted image data (input image) to the image dictionary creating portion 50. The character recognizing portion 410 (FIG. 4) of the image input portion 40 performs character recognition processing on the input image, determines the character codes and the position information of the character images included in the input image one character at a time, and outputs the determined character code, position information and character images (binary) to the image dictionary creating portion 50 one character at a time.

At step 22 (S22), the storage portion 500 of the image dictionary creating portion 50 stores, into the memory 204 (FIG. 3), the character images, the character codes and the position information inputted one character at a time from the image input portion 40. When not an extracted character image but the entire input image is inputted from the image input portion 40, the character image extracting portion 510 extracts the character images from the input image one character at a time based on the character codes and the position information inputted one character at a time, and outputs them to the storage portion 500.

At step 46 (S46), the registration controller 570 determines whether to register the newly inputted character image in the image dictionary as an image pattern or not in cooperation with the coincidence determining portion 530 and the position correcting portion 550.

At step 52 (S52), when the registration controller 570 determines that the inputted character image is registered in the image dictionary as an image pattern, the processing shifts to the processing of S54, and when the registration controller 570 determines that the inputted character image is not registered as an image pattern, the process shifts to the processing of S62. The position information of the character image determined not to be registered is associated with the index of the image pattern most similar to the character image, and outputted to the coding portion 60.

At step 54 (S54), the index assigning portion 560 assigns an index to the newly inputted character image (one registered as the image pattern), outputs this character image and the index to the storage portion 500, and outputs the position information of this character image and the index of this character image to the coding portion 60.

At step 62 (S62), the coding portion 60 codes the index and the position information inputted from the image dictionary creating portion 52 (FIG. 18) one character at a time, and outputs them to the printer 10 or the like.

At step 80 (S80), the coding program 5 determines whether the processing is finished for all the character images included in the input image or not. When determining that the processing is finished, the coding program 5 codes the image dictionary, outputs it to the printer 10 or the like, and ends the operation (S2). When determining that the processing is not finished, the coding program 5 returns to the processing of S22 and performs the processing on the next character image.

FIG. 20 is a flowchart explaining the image pattern registration determination processing (S46) according to the second embodiment in more detail. Of the processings in this figure, substantially the same processings as those shown in FIG. 8 are denoted by the same reference numerals.

As shown in FIG. 20, at step 462 (S462), the coincidence determining portion 530 compares the newly inputted character image with the image patterns stored as the image dictionary by the storage portion 500, and determines the degree of coincidence at a plurality of relative positions. Specifically, the coincidence determining portion 530 calculates the number of coinciding pixels K of the black pixels while shifting the image patterns registered in the image dictionary and the newly inputted character image from each other.

The number of coinciding pixels K is calculated by the following expression:

(The number of coinciding pixels $K$)=$\Sigma\{S(x)*P(i,x-vi)\}$ where S(x) is the pixel distribution of the image pattern.

Then, the coincidence determining portion 530 normalizes the calculated number of coinciding pixels K to calculate the coinciding pixel rate K'.

The coinciding pixel rate K' is calculated by the following expression:

(The coinciding pixel rate $K'$)=$K/M$ where M is the number of pixels constituting the character image.

At S404, the position correcting portion 550 determines the correction vector of the position information inputted from the character recognizing portion 410 based on the degree of coincidence calculated at a plurality of relative positions by the coincidence determining portion 530. Specifically, the position correcting portion 550 sets, as the correction vector, the shifting vector vi when the coinciding pixel rate K' calculated by the coincidence determining portion 530 becomes highest.

At step 464 (S464), the registration controller 570 compares the coinciding pixel rate K' determined by the coincidence determining portion 530 with the reference value for determining whether to register the image pattern or not. When the coinciding pixel rate K' is not less than the reference value, the process shifts to the processing of S466, and when the coinciding pixel rate K' is lower than the reference value, the process shifts to the processing of S470.

At step 466 (S466), the registration controller 570 prohibits the registration of this character image in the image dictionary. Further, the registration controller 570 reads out the index of the image pattern most similar to this character image (that is, the image pattern whose coinciding pixel rate K' is the highest) from the image dictionary.

At step 467 (S467), the registration controller 570 outputs the read index and the position information of this character image (one corrected by the position correcting portion 550) to the coding portion 60.

At step 470 (S470), the registration controller 570 instructs the dictionary determining portion 540 to register the newly inputted character image in the image dictionary as an image pattern.

The dictionary determining portion 540 registers the inputted character image (one position-corrected by the position correcting portion 550) in the storage portion 500 (image pattern storing section) as an image pattern.

As described above, in the image processor 2 according to the second embodiment, the character images are extracted one character at a time based on the position information of the character images, whether to register the extracted character images in the image dictionary or not is determined one character at a time, and coding is performed based on the result of the determination. By this, the coding processing can be performed sequentially.

Next, a modification of the second embodiment will be described.

The image dictionary creating portion 52 stores the character images registered in the image dictionary as image patterns so as to be associated with character codes, and compares the newly inputted character image with the image pattern whose character code coincides with priority to determine the degree of coincidence. For example, when the character images are registered in the image dictionary as image patterns, the dictionary determining portion 540 registers the character codes of these character images so as to be associated with the image patterns. The coincidence determining portion 530 reads out only the image pattern whose character code coincides with that of the newly inputted character image from the image dictionary, compares the read image pattern with the inputted character image, and calculates the coinciding pixel rate K'. The registration controller 570 determines whether to register the inputted character image in the image dictionary as an image pattern or not based on only the coinciding pixel rate K' between the image pattern whose character code coincides and the inputted character image.

This enables the image dictionary creating portion 52 to reduce the number of times of the coincidence degree determination processing.

Moreover, the image dictionary creating portion 52 may assign a weight to the determined degree of coincidence based on the character code of the inputted character image. Moreover, the image dictionary creating portion 52 may assign a weight to the determined degree of coincidence based on the accuracy of the character recognition processing by the character recognizing portion 410.

FIG. 21A is a view illustrating the weight assignment coefficients of the weight assignment processing based on the character codes, and FIG. 21B is a view illustrating the weight assignment coefficient of the weight assignment processing based on the accuracy of the character recognition processing.

As illustrated in FIG. 21A, the registration controller 570 (weight assigning section) has a different weight assignment coefficient according to whether the character code of the inputted character image and the character code of the image pattern coincide with each other or not, and assigns a weight to the degree of coincidence (for example, the coinciding pixel rate K') determined by the coincidence determining portion 530. More specifically, the registration controller 570 assigns a weight so that the coinciding pixel rate K' is higher when the character code of the inputted character image and the character code of the image pattern coincide with each other than when these character codes do not coincide with each other. That is, the image dictionary creating portion 52, since it is presumed that the character image is the same as the image pattern as a character when the character codes coincide with each other, assigns a weight to the degree of coincidence so that the character image is determined to coincide or be similar also as an image.

The weight assignment processing according to the character codes is not limited to the one based on whether the character codes coincide with each other or not. For example, the weight assignment processing may be performed by setting a weight assignment coefficient corresponding to a combination of specific character codes (for example, a combination of ones having similar shapes such as a numeric character "1" and a letter "l") so that the weight assignment processing is performed based on the combination of the character codes, or the weight assignment processing may be performed by setting a weight assignment coefficient according to the requirement of the readability (for example, weight assignment that differs between the character code of a kanji character and the character code of a hiragana character).

Moreover, as illustrated in FIG. 21(B), the registration controller 570 (weight assigning section) has a different weight assignment coefficient according to the accuracy of the character recognition processing of the inputted character image, and assigns a weight to the degree of coincidence (for example, the coinciding pixel rate K') determined by the coincidence determining portion 530. More specifically, the registration controller 570 assigns a weight so that the higher the accuracy of the character recognition processing is, the higher the coinciding pixel rate K' is. That is, the image dictionary creating portion 52, since the extraction position and the like of the character image are sometimes inaccurate when the accuracy of the character recognition processing is low, performs weight assignment so that the reference for the character image to be determined to coincide with or be similar to the image pattern is high. Moreover, it is favorable for the registration controller 570 to perform weight assignment according to the accuracy of the character recognition processing when it is presumed that the weight assignment processing based on whether the character codes coincide with each other or not is performed.

Figure 22:
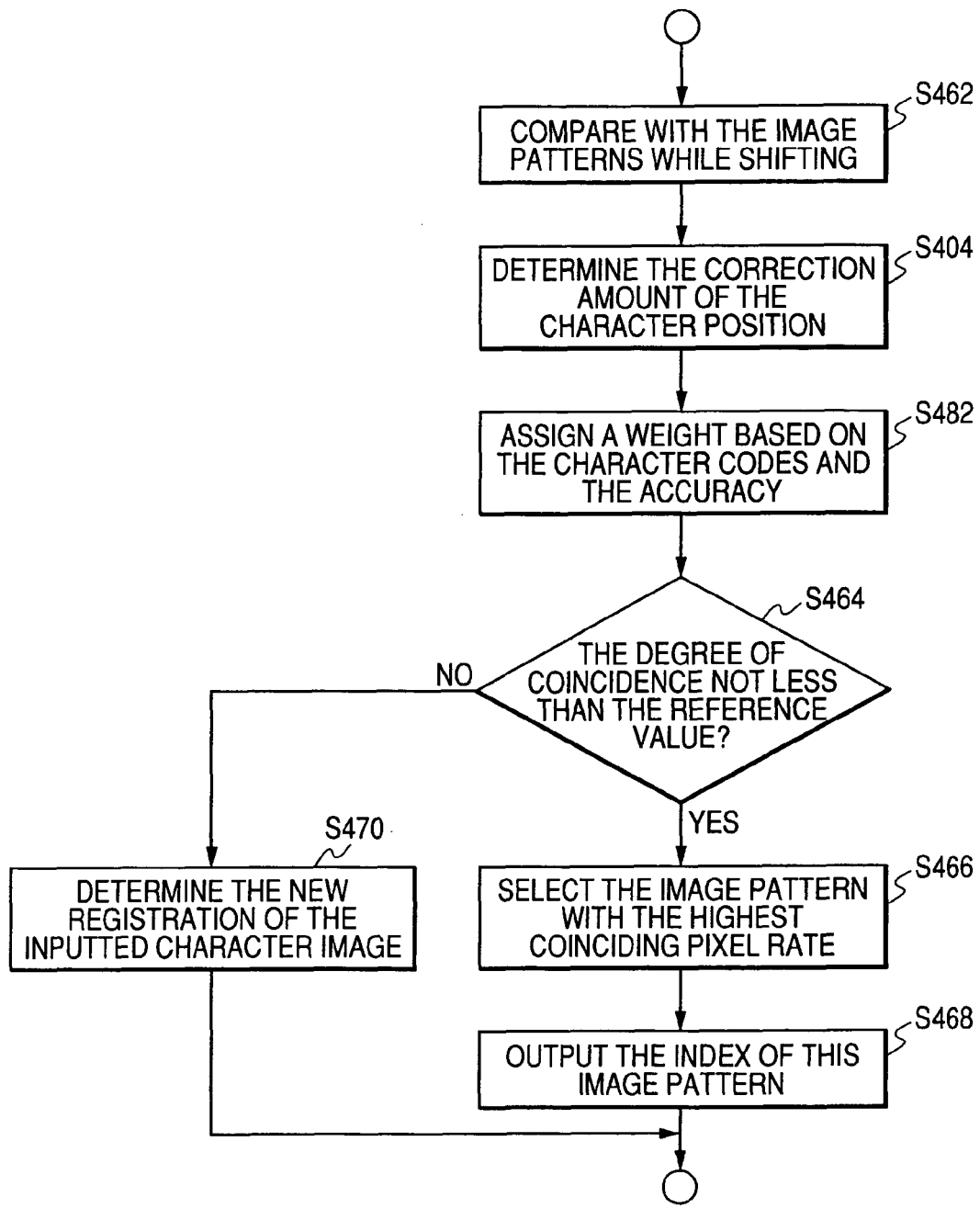
FIG. 22 is a flowchart explaining the operation (S48) of the image dictionary creating portion 52 according to the present modification of the second embodiment.

FIG. 22 is a flowchart explaining the operation (S48) of the image dictionary creating portion 52 according to the present modification. Of the processings in this figure, substantially the same processings as those shown in FIG. 20 are denoted by the same reference numerals.

As shown in FIG. 22, at S462 and S404, the coincidence determining portion 530 calculates the coinciding pixel rate K' of the black pixels while shifting the image patterns registered in the image dictionary and the newly inputted character image from each other, and the position correcting portion 550 calculates the correction vector based on the coinciding pixel rate K' calculated by the coincidence determining portion 530.

At step 482 (S482), the registration controller 570 multiplies the coinciding pixel rate K' calculated with respect to each image pattern by the weight assignment coefficient according to whether the character codes coincide with each other or not.

Further, the registration controller 570 obtains the accuracy of the character recognition processing on the character image from the character recognizing portion 410, and multiplies the coinciding pixel rate K' by the weight assignment coefficient according to the obtained accuracy of the character recognition processing.

At S464, the registration controller 570 compares the coinciding pixel rate K' on which weight assignment has been performed based on whether the character codes coincide with each other or not and the accuracy of the character recognition processing with the reference value, and determines whether to register this character image in the image dictionary as an image pattern or not.

As described above, the image dictionary creating portion 52 is capable of registering more appropriate image patterns in the image dictionary by assigning a weight to the determined degree of coincidence based on whether the character codes coincide with each other or not and the accuracy of the character recognition processing.

FIG. 1
  Coding side
  Character codes, font types, positions of occurrence, etc.
  Decoding side
  Different coding methods for characters and images
  Font DB
  Association is required
  Image dictionary, indices, positions of occurrence, etc.

FIG. 2
  Index Image pattern (binary image)

FIG. 3
  2 Image processor
  10 Printer
  20 Controller
  22 Communication device
  24 Storage device
  26 UI device
  204 Memory 240 Storage medium FIG. 4
To scanner
To storage device, etc.
40 Image input portion
410 Character recognizing portion
420 PDL decomposer
50 Image dictionary creating portion
60 Coding portion
Coding program 5

FIG. 5
Image dictionary creating portion 50
Character codes
Character area information
Input image data
Dictionary data
  Character area information (after correction)
  Input image data
500 Storage portion
  510 Character image extracting portion
  520 Character classifying portion
  530 Coincidence determining portion
  540 Dictionary determining portion
  550 Position correcting portion
  560 Index assigning portion FIG. 6
Coding portion 60
  610 Pattern determining portion
  620 Position information coding portion
  630 Index coding portion
  640 Image coding portion
  650 Dictionary coding portion
  660 Selecting portion
  670 Code output portion FIG. 7
Start
S10 Obtain image data
S20 Extract the character images
S30 Classify the character images based on character codes
S40 Determine the image patterns from the classified character images
S50 Assign indices to the image patterns
S60 Coding processing
S70 Output the coded data
End FIG. 8
Image pattern determination processing S40
S402 Compare the character images of the same classification while shifting them
S404 Determine the correction amount of the character position
S406 Calculate the degree of coincidence of the character images of the same classification
S408 Coincidence degree threshold processing
S410 Pixels of the number larger than the reference value present?
S412 Determine image patterns FIG. 9
Coding processing S60
S602 Compare the partial images and the image patterns
S604 Coinciding patterns present?
S606 Code the index of the coinciding image pattern
S608 Code the position information of the partial image
S610 Code the partial image S612 Finished with respect to all the images?
S614 Code the dictionary data FIG. 10
The same character code
Character recognition error
The same character code ("1" or "I")

FIG. 11
Image pattern determination processing S42
S402 Compare the character images of the same classification while shifting them
S404 Determine the correction amount of the character position
S406 Calculate the degree of coincidence of the character images of the same classification
S408 Coincidence degree threshold processing
S410 Pixels of the number larger than the reference value present?
S422 Determine the sum coupling pattern of the same classification
S424 Multiply the sum coupling pattern and the character images FIG. 12
Distribution probability $Q'(x)$
Threshold value B
Pixel position x
Generate sum coupling pattern
Sum coupling pattern $Q''(x)$
Character image #1
Image pattern #1

FIG. 13
The same character code
Second level pattern a
First level pattern

FIG. 14
Image pattern determination processing S44
S402 Compare the character images of the same classification while shifting them
S404 Determine the correction amount of the character position
S406 Calculate the degree of coincidence of the character images of the same classification
S408 Coincidence degree threshold processing
S410 Pixels of the number larger than the reference value present?
S442 Extract the first level pattern
S444 Extract the second level pattern
S446 Hierarchize and output the level patterns FIG. 15
Distribution probability $Q'(x)$
First level threshold value
Second level threshold value
Pixel position x
(extracted according to the degree of coincidence)
First level pattern
Second level sum coupling pattern $Q1''(x)$
Character image #1
Second level pattern a FIG. 16
Coding processing S64
S602 Compare the partial image and the image pattern
S610 Code the partial image
S642 Coinciding first level pattern present?
S644 Code the index of the first level pattern S646 Extract the difference from the first level pattern
S648 Coinciding second level pattern present?
S650 Code the index of the second level pattern
S608 Code the position information of the partial image
S612 Finished with respect to all the images?
S614 Code the dictionary data FIG. 17
Accuracy
Character code
Character image
Not less than 90%
Not less than 70% and less than 90%
Less than 70%
The same character code FIG. 18
Image dictionary creating portion 52
Character codes
Character area information
Input image data
Dictionary data
   Character area information (after correction)
   Input image data
500 Storage portion
   510 Character image extracting portion
   520 Character classifying portion
   530 Coincidence determining portion
   540 Dictionary determining portion
   550 Position correcting portion
   560 Index assigning portion
   570 Registration controller FIG. 19
Start
S10 Obtain image data
S22 Extract character images and transfer them one character image at a time
S46 Determine register/non-register as an image pattern or not
S52 Register?
S54 Assign an index to the image pattern
S62 Coding processing
S80 Finished with respect to all the character images?
End FIG. 20
Image pattern registration determination processing S46
S462 Compare with the image patterns while shifting
S404 Determine the correction amount of the character position
S464 The degree of coincidence not less than the reference value?
S466 Select the image pattern with the highest coinciding pixel rate
S468 Output the index of this image pattern
S470 Determine the new registration of the inputted character image FIG. 21
Character code Weight assignment
Coincidence 1.2 times
Noncoincidence 1 time
Recognition accuracy Weight assignment
Not less than 90% 1.2 times
Not less than 70% and less than 90% 1 time
Less than 70% 0.8 times FIG. 22
Image pattern registration determination processing S48
S462 Compare with the image patterns while shifting
S404 Determine the correction amount of the character position
S482 Assign a weight based on the character codes and the accuracy
S464 The degree of coincidence not less than the reference value?
S466 Select the image pattern with the highest coinciding pixel rate
S468 Output the index of this image pattern
S470 Determine the new registration of the inputted character image

What is claimed is:

1. An image processing system stored on a non-transitory computer-readable storage medium comprising:
an information obtaining section that obtains a character image included in an input image and character identification information that identifies a character represented by the character image;
a character classifying section that classifies the character image included in the input image into a plurality of character image groups based on the character identification information obtained by the information obtaining section;
a typical image pattern determining section that determines a typical image pattern constituting the input image based on the character image classified into the character image groups by the character classifying section;
an identification information assigning section that assigns identification information for identifying the typical image pattern, to the typical image pattern determined by the typical pattern determining section;
a coding section that codes character area information representative of areas of the character image included in the input image and the identification information of the typical image pattern corresponding to the character image so as to be associated with each other;
a decoding section that decodes the character area information; and
a transmitting section that transmits an image dictionary in which the typical pattern and the identification information are associated with each other, the character area information coded by the coding section and the identification information coded by the coding section to the decoding section, the identification information being assigned by the identification information assigning section for identifying the typical image pattern corresponding to the identification information, wherein
the decoding section decodes the character area information coded by the coding section and the identification information coded by the coding section with the image dictionary,
the decoding section disposes the typical image pattern corresponding to the decoded identification information,
the coding section compares the typical image pattern and partial image included by the input image, and
when the partial image coinciding with the typical image pattern are present, the coding section codes the partial image after replacing the partial image with the identification information and the character area information.

2. The image processing system according to claim 1, wherein the information obtaining section obtains character identification information for identifying a character represented by each character image as a result of the character recognition processing, and wherein the character classifying section classifies the character image included in the input image into the plurality of character image groups based on the character identification information obtained by the information obtaining section.

3. The image processing system according to claim 1, wherein the character identification information includes a character code, wherein the character classifying section classifies the character image included in the input image based on the character code, and wherein based on the character image classified as having a same character code as the character code of the character identification information, the typical image pattern determining section determines the typical image pattern corresponding to the character image.

4. The image processing system according to claim 1, wherein the information obtaining section further obtains recognition accuracy information of a character recognition processing so as to be associated with the character identification information or the character area information thereof, and wherein the character classifying section classifies the character image included in the input image into the plurality of character image groups based on the recognition accuracy information and the character identification information or the character area information.

5. The image processing system according to claim 1, wherein the typical image pattern is determined from a plurality of character images.

6. The image processing system according to claim 1, further comprising:

a coincidence determining section that determines a degree of coincidence of each area included in a plurality of character images classified into the character image groups by the character classifying section by comparing the character images with each other, wherein the typical pattern determining section determines a plurality of image patterns constituting the character image based on the degree of coincidence determined with respect to each area by the coincidence determining section.

* * * * *